(12) United States Patent
Saita

(10) Patent No.: US 9,004,668 B2
(45) Date of Patent: Apr. 14, 2015

(54) INKJET RECORDING APPARATUS AND INKJET RECORDING METHOD

(71) Applicant: Fujifilm Corporation, Tokyo (JP)

(72) Inventor: Hirofumi Saita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 54 days.

(21) Appl. No.: 13/829,707

(22) Filed: Mar. 14, 2013

(65) Prior Publication Data

US 2013/0250018 A1    Sep. 26, 2013

(30) Foreign Application Priority Data

Mar. 21, 2012 (JP) ................................ 2012-063576

(51) Int. Cl.
*B41J 11/00* (2006.01)
*C09D 11/30* (2014.01)
*C09D 11/101* (2014.01)

(52) U.S. Cl.
CPC ............... *B41J 11/002* (2013.01); *C09D 11/30* (2013.01); *C09D 11/101* (2013.01)

(58) Field of Classification Search
CPC ............................... B41J 11/002; C09D 11/30
USPC ......................................................... 347/102
See application file for complete search history.

(56) References Cited

U.S. PATENT DOCUMENTS

| | | | |
|---|---|---|---|
| 2003/0011670 A1 | 1/2003 | Shirakawa | |
| 2006/0012630 A1* | 1/2006 | Niekawa | 347/37 |
| 2007/0024686 A1* | 2/2007 | Kadomatsu et al. | 347/102 |
| 2009/0244116 A1* | 10/2009 | Ohnishi | 347/6 |
| 2009/0244230 A1 | 10/2009 | Ohnishi et al. | |
| 2010/0026738 A1* | 2/2010 | Saikawa et al. | 347/1 |
| 2010/0182378 A1* | 7/2010 | Mitsuzawa | 347/51 |
| 2011/0074857 A1 | 3/2011 | Mitsuzawa | |
| 2011/0085013 A1* | 4/2011 | Onishi et al. | 347/102 |
| 2011/0134179 A1* | 6/2011 | Otsuka et al. | 347/16 |
| 2011/0205320 A1* | 8/2011 | Mitsuhashi | 347/102 |
| 2011/0242243 A1* | 10/2011 | Miyabayashi | 347/102 |

FOREIGN PATENT DOCUMENTS

| | | |
|---|---|---|
| EP | 2412765 A1 | 2/2012 |
| JP | 2003-011334 A | 1/2003 |
| JP | 2005-199457 A | 7/2005 |
| JP | 2009-208228 A | 9/2009 |

(Continued)

OTHER PUBLICATIONS

An Office Action; "Notification of Reasons for Rejection," issued by the Japanese Patent Office on Jan. 22, 2014, which corresponds to Japanese Patent Application No. 2012-063576 and is related to U.S. Appl. No. 13/829,707; with English language partial translation.

*Primary Examiner* — Manish S Shah
*Assistant Examiner* — Roger W Pisha, II
(74) *Attorney, Agent, or Firm* — Studebaker & Brackett PC

(57) ABSTRACT

According to an aspect of the present invention, by switching off the provisional curing device on the rear side in the direction of travel of the scanning direction, droplet ejection is carried out without performing provisional curing of the ink immediately after droplet ejection. The provisional curing of the ink is carried out by the provisional curing device on the front side in the direction of travel of the scanning direction, during scanning in the opposite direction to that during droplet ejection.

8 Claims, 15 Drawing Sheets

(56) References Cited

FOREIGN PATENT DOCUMENTS

| | | |
|---|---|---|
| JP | 2011-073329 A | 4/2011 |
| JP | 2011-073330 A | 4/2011 |
| JP | 2012-046724 A | 3/2012 |
| WO | 2009/148074 A1 | 12/2009 |

* cited by examiner

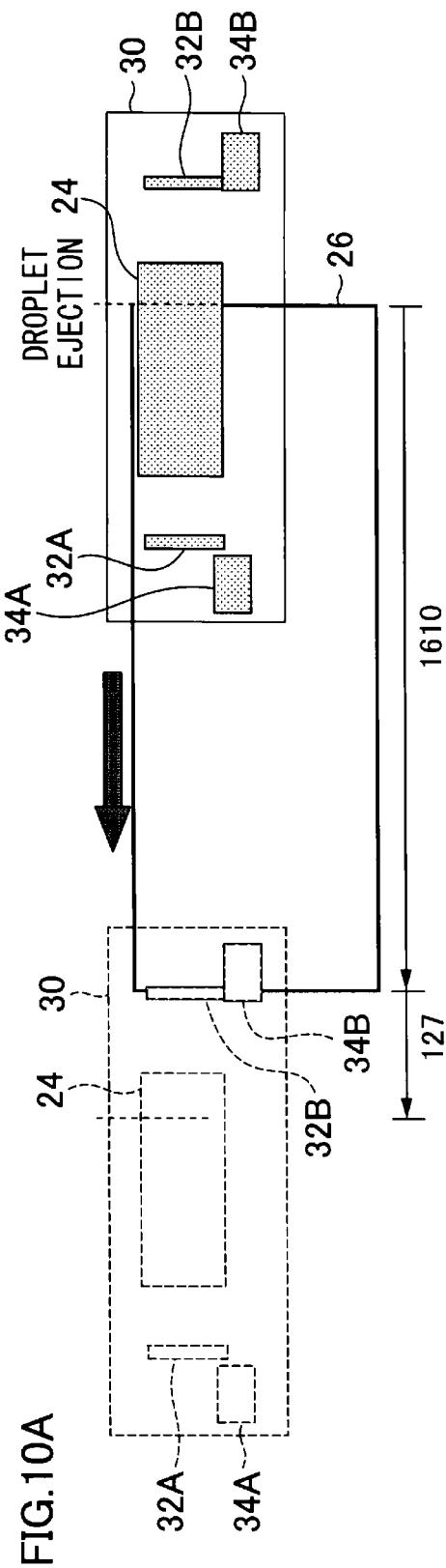
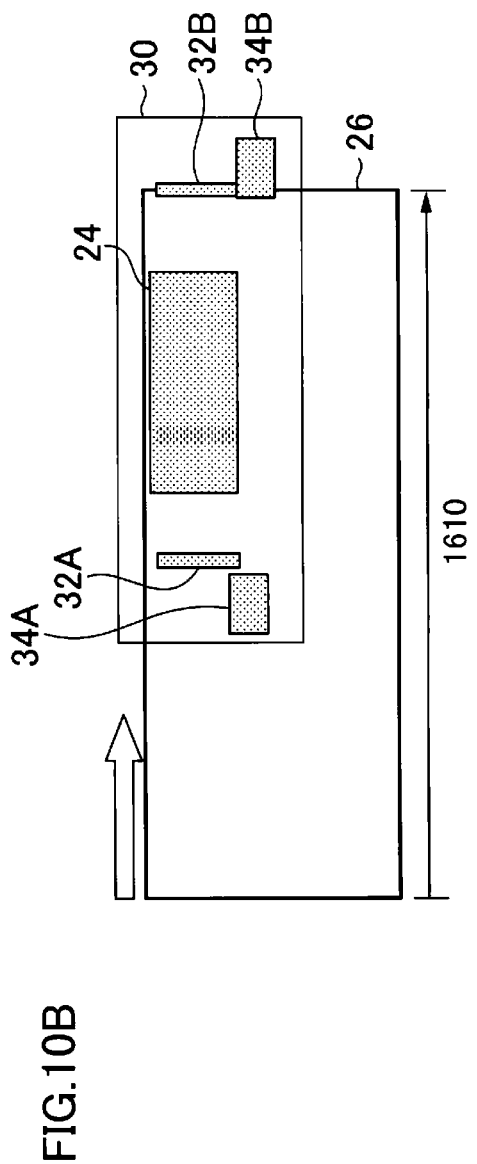

Y COLOR: ONE-SIDE SWITCHED ON

M COLOR: ONE-SIDE SWITCHED ON

C COLOR: ONE-SIDE SWITCHED ON

K COLOR: ONE-SIDE SWITCHED ON

3C COLOR: ONE-SIDE SWITCHED ON

4C COLOR: ONE-SIDE SWITCHED ON

Y: FRONT SIDE 42% BRIGHTNESS

M: FRONT SIDE 42% BRIGHTNESS

C: FRONT SIDE 42% BRIGHTNESS

K: FRONT SIDE 42% BRIGHTNESS

3C: FRONT SIDE 42% BRIGHTNESS

4C: FRONT SIDE 42% BRIGHTNESS

Y: IMAGE WIDTH SCANNING

K: IMAGE WIDTH SCANNING

M: IMAGE WIDTH SCANNING

3C: IMAGE WIDTH SCANNING

C: IMAGE WIDTH SCANNING

4C: IMAGE WIDTH SCANNING

Y: PAPER FULL WIDTH SCANNING

K: PAPER FULL WIDTH SCANNING

M: PAPER FULL WIDTH SCANNING

3C: PAPER FULL WIDTH SCANNING

C: PAPER FULL WIDTH SCANNING

4C: PAPER FULL WIDTH SCANNING

NORMAL IMAGE SURFACE

IMAGE SURFACE HAVING INCREASED GLOSSINESS
ACCORDING TO THE PRESENT INVENTION

FOURIER TRANSFORM IMAGE OF NORMAL PINNING EXPOSURE

FOURIER TRANSFORM IMAGE WITH INCREASED GLOSSINESS

INKJET RECORDING APPARATUS AND INKJET RECORDING METHOD

BACKGROUND OF THE INVENTION

1. Field of the Invention

The present invention relates to an inkjet recording apparatus and an inkjet recording method, and more particularly to an inkjet recording apparatus and an inkjet recording method using ink which is cured by irradiation with an active light beam, such as ultraviolet light.

2. Description of the Related Art

Conventionally, image formation is performed onto a recording medium by ejecting ink from an inkjet head onto a recording surface of a recording medium. In the field of image formation by an inkjet recording apparatus of this kind, a recording apparatus has been developed which is based on a method using an ultraviolet-curable ink containing a photo initiator having a prescribed sensitivity with respect to ultraviolet light; the ultraviolet-curable ink which has been deposited on a recording medium is cured and fixed on the recording medium by emitting ultraviolet light thereon.

In an inkjet recording apparatus which uses ultraviolet-curable ink, a light source for emitting ultraviolet light is mounted on a carriage on which an inkjet head is installed, the ultraviolet light source is scanned so as to follow the inkjet head, and ultraviolet light is emitted onto ink droplets immediately after landing on a medium, thereby preventing positional displacement of the ink droplets.

In order to cure ultraviolet-curable ink by irradiation with ultraviolet light, it is necessary to use a highly sensitive ink, but if the sensitivity of the ink is high, then a very pronounced undulating shape occurs in deposited ink droplets, and the ink becomes cured in a state where an undulating shape has occurred in the deposited ink droplets. Consequently, there is a problem of reduced glossiness of the image.

In order to resolve a problem of this kind, for example, Japanese Patent Application Publication No. 2011-73330 discloses a composition of an inkjet printer including an irradiation unit for provisional curing (pinning) and an irradiation unit for main curing, in which smoothing of the ink is promoted by carrying out provisional curing with a low irradiation amount when operating in high-gloss printing mode, so as to obtain an image with a gloss finish. WO 09/148074 discloses raising the glossiness by emitting ultraviolet light after ejecting clear ink and allowing a certain period of time to elapse so that the surface has become smooth.

SUMMARY OF THE INVENTION

However, by using an ink of high sensitivity, the undulating shape becomes more pronounced. Therefore, the apparatus and method described in Japanese Patent Application Publication No. 2011-73330 and WO 09/148074 have not produced sufficient glossiness. Furthermore, Japanese Patent Application Publication No. 2011-73330 describes changing the glossiness with the extent of leveling of clear ink, by controlling the emission amount of UV light and the carriage scanning speed, but does not describe leveling of color ink. Moreover, WO 09/148074 also only describes guaranteeing sufficient time for leveling of the clear ink after ink ejection and before irradiation with ultraviolet light, and does not mention leveling of color inks. Therefore, leveling of the ink cannot be achieved in the case of color inks, wrinkles occur and the gloss finish is lost. Moreover, with the apparatus described in Japanese Patent Application Publication No. 2011-73330, glossiness is raised by lowering the brightness of provisional curing (pinning), but there is no mention of guaranteeing a prescribed time period from the deposition of ink until irradiation with UV light.

The present invention was devised in view of these circumstances, an object thereof being to improve glossiness by suppressing the occurrence of wrinkles that occur on the surface of ejected droplets of color ink, on the basis of a relationship between the time until irradiation with UV light and the brightness of the UV light.

In order to achieve the above object, an aspect of the present invention provides an inkjet recording apparatus, including: a carriage which is equipped with: an emission unit which emits an active light beam; and an image forming unit which forms an image by inkjet ejection of ink that is cured by the active light beam, wherein the carriage has a scanning device which bi-directionally scans a recording medium in a scanning direction perpendicular to a direction of conveyance of the recording medium, and the emission unit includes provisional curing devices which are provided on both sides of the image forming unit in the scanning direction, and a main curing device which is provided on a downstream side of the conveyance direction of the recording medium, the inkjet recording apparatus further including a control unit which implements droplet ejection while switching on the provisional curing device on a front side in the scanning direction, and switching off the provisional curing device on a rear side in the scanning direction.

According to the present invention, by switching off the provisional curing device on the rear side in the direction of travel of the scanning direction, droplet ejection is carried out without performing provisional curing of the ink immediately after droplet ejection. The provisional curing of the ink is carried out by the provisional curing device on the front side in the direction of travel of the scanning direction, during scanning in the opposite direction to that during droplet ejection. Consequently, since the time from droplet ejection until provisional curing can be increased, then the ink which has been ejected as droplets is able to become leveled in the period from droplet ejection until provisional curing. Therefore, the formation of undulating wrinkles on the surface of the image can be reduced, and hence a smooth surface which readily reflects light can be formed and the glossiness can be improved.

The "provisional curing device on the front side in the direction of travel of the scanning direction" means the provisional curing device which precedes the image forming unit, and the "provisional curing device on the rear side in the direction of travel of the scanning direction" means the provisional curing device which follows the image forming unit. Since the carriage can perform a scanning action in two directions, the front side and rear side provisional curing devices are different, depending on the direction of travel.

In the inkjet recording apparatus relating to another aspect of the present invention, it is preferable that emission by the provisional curing devices is carried out in a range of from 0.1 second to 3 seconds after the ejection of ink droplets.

According to the inkjet recording apparatus relating to the another aspect of the present invention, it is possible to form an image having improved glossiness, by setting the time from droplet ejection until provisional curing to the range described above. If the time until provisional curing is longer than the range described above, then banding non-uniformities (density non-uniformities or gloss non-uniformities occurring with a periodicity corresponding to the swatch width) are liable to occur.

In the inkjet recording apparatus relating to a further aspect of the present invention, it is preferable that the ink is color ink.

According to the inkjet recording apparatus relating to the further aspect of the present invention, it is possible to suppress the occurrence of wrinkles in the formed image, even when using color ink, and therefore the inkjet recording apparatus is desirable for use with color ink. Here "color ink" means an ink other than white ink and clear ink.

In the inkjet recording apparatus according to a further aspect of the present invention, it is preferable that the ink contains a radically polymerizable compound as a component A, a radical polymerization initiator as a component B, and a colorant as a component C; the component A contains a monofunctional radically polymerizable compound as a component A-1, and a polyfunctional radically polymerizable compound as a component A-2; the component A-1 contains an N-vinyl compound as a component A-1-1 and a compound represented by Formula (I) below as a component A-1-2; the content of the component A-1 is not less than 50 weight percent and not more than 90 weight percent with respect to a total weight of the component A; the content of the component A-1-1 is not less than 10 weight percent and not more than 40 weight percent with respect to a total weight of the component A-1; the content of the component A-1-2 is not less than 5 weight percent and not more than 90 weight percent with respect to the total weight of the component A-1; and the component A-2 contains at least two types of compound represented by Formula (II) below, the content of the component A-2 being not less than 0.1 weight percent and not more than 25 weight percent with respect to the total weight of the component A.

[Formula 1]

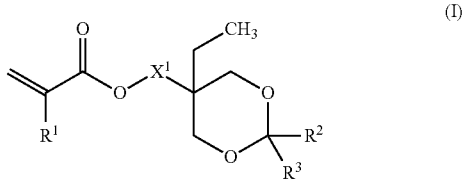

(I)

(where, $R^1$, $R^2$ and $R^3$ respectively and independently represent a hydrogen atom, a methyl group, or an ethyl group, and $X^1$ represents a single bond or a bivalent linking group.)

[Formula 2]

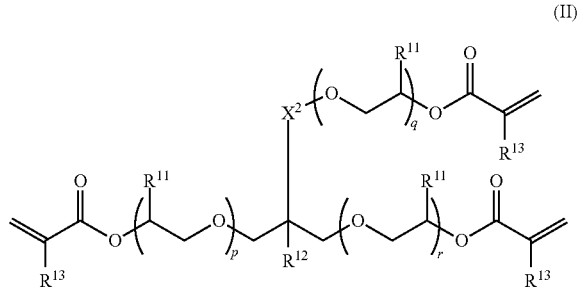

(II)

(where, $R^{11}$ respectively and independently represents a hydrogen atom or an alkyl group having 1 to 6 carbon atoms which may be substituted, $R^{12}$ represents a hydrogen atom or an alkyl group having 1 to 6 carbon atoms which may be substituted, $R^{13}$ respectively and independently represents a hydrogen atom or a methyl group, $X^2$ represents a single bond or a bivalent linking group, and p, q and r respectively and independently represent an integer from 0 to 5).

According to the further aspect of the present invention, the glossiness can further be improved by using the above-described ink composition in forming an image.

In the inkjet recording apparatus relating to a further aspect of the present invention, it is preferable that a movement distance of the carriage in the scanning direction is equal to a width of the recording medium.

According to the inkjet recording apparatus relating to the further aspect of the present invention, by setting the movement distance of the carriage to a distance equal to the width of the recording medium, it is possible to guarantee a prescribed time from droplet ejection until provisional curing.

In the inkjet recording apparatus relating to a further aspect of the present invention, it is preferable that a movement distance of the carriage in the scanning direction is an end to end possible movement distance for the scanning device.

According to the inkjet recording apparatus relating to the further aspect of the present invention, by setting the movement distance of the carriage to the maximum possible movement distance by the scanning device, it is possible to increase the time from droplet ejection until provisional curing yet further, and therefore provisional curing can be carried out in a state where leveling of the ink after droplet ejection has progressed yet further, which means that glossiness can be further improved.

In the inkjet recording apparatus relating to a further aspect of the present invention, it is preferable that droplet ejection of the ink is carried out in both directions of movement of the carriage.

According to the inkjet recording apparatus relating to the further aspect of the present invention, since ink droplet ejection can be carried out in both directions of movement of the carriage, then it is possible to perform leveling of the ink in respect of ink droplet ejection in both directions.

In the inkjet recording apparatus relating to a further aspect of the present invention, it is preferable that droplet ejection of the ink is carried out only in one of both directions of movement of the carriage.

According to the inkjet recording apparatus relating to the further aspect of the present invention, it is possible to achieve leveling of the ink, even when ink droplet ejection is performed while the carriage is moved in one direction only.

In order to achieve the above object, the present invention provides an inkjet recording method, including: a recording medium conveyance step of conveying a recording medium; a scanning step of scanning the recording medium, in a scanning direction perpendicular to a conveyance direction of the recording medium, by a carriage equipped with an emission unit which emits an active light beam and an image forming unit which forms an image by inkjet ejection of ink that is cured by the active light beam, the scanning step being able to perform bidirectional scanning; an ink ejection step of ejecting the ink by inkjet during the scanning step; a provisional curing device changing step of controlling provisional curing devices provided on both sides of the image forming unit in the scanning direction, so as to switch on the provisional curing device on a front side in the scanning direction and so as to switch off the provisional curing device on a rear side in the scanning direction; a provisional curing step of emitting the active light beam to an extent which incompletely cures the ink droplets which have become deposited to the recording medium, during scanning operation in an opposite direction to the scanning direction in the ink ejection step; and a main curing step of emitting an active light beam which fully cures the ink droplets by carrying out additional exposure on the ink droplets which have been exposed in the provisional curing step.

According to the present invention, it is possible to achieve similar beneficial effects to the inkjet recording apparatus described above.

According to the inkjet recording apparatus and the inkjet recording method of the present invention, it is possible to suppress the occurrence of wrinkles on the surface of ink that has been ejected as droplets, by controlling a brightness and time until emission of an active light beam, such as an ultraviolet light beam, and therefore the glossiness of the formed image can be improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 10A and 10B are diagrams illustrating a time period from ink droplet ejection until provisional curing, when a carriage is moved through a possible movement width;

DETAILED DESCRIPTION OF THE PREFERRED EMBODIMENTS (General Composition of Inkjet Recording Apparatus)

Figure 1:
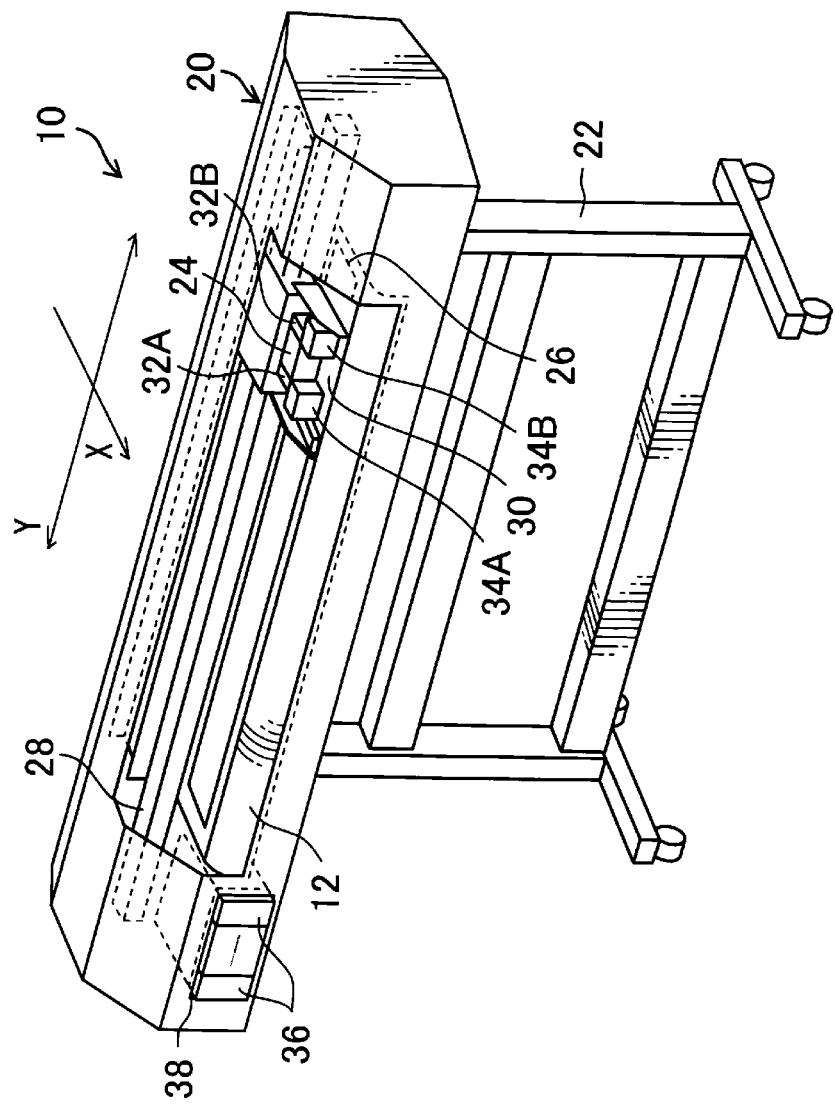
FIG. 1 is an external perspective drawing of an inkjet recording apparatus relating to an embodiment of the present invention.

FIG. 1 is an external perspective drawing of an inkjet recording apparatus relating to an embodiment of the present invention. This inkjet recording apparatus 10 is a wide-format printer which forms a color image on the recording medium 12 by using radiation beam (active light beam)-curable ink (UV-curable ink). A wide-format printer is an apparatus which is suitable for recording a wide image formation range, such as for large posters or commercial wall advertisements, or the like. Here, a printer corresponding to a medium having a size of super A3 or greater is called "wide-format".

The inkjet recording apparatus 10 includes an apparatus main body 20 and a stand 22 which supports the apparatus main body 20. The apparatus main body 20 including a drop-on-demand type of inkjet head 24 which ejects ink toward a recording medium (medium) 12, a platen 26 which supports the recording medium 12, and a guide mechanism 28 and a carriage 30 which form a head movement device (scanning device). The guide mechanism 28 is disposed so as to extend above the platen 26, following a scanning direction (Y direction) which is parallel to the medium supporting surface of the platen 26 and which is perpendicular to the conveyance direction (X direction) of the recording medium 12. The carriage 30 is supported so as to be able to perform reciprocal movement in the Y direction along a guide mechanism 28. The inkjet head 24 is mounted on the carriage 30, and provisional curing light sources (pinning light sources) 32A, 32B, and main curing light sources (curing light sources) 34A, 34B which emit an active light beam such as ultraviolet light onto the ink after the recording medium 12 are also mounted on the carriage 30.

The provisional curing light sources 32A, 32B are light sources which emit an active light beam, such as ultraviolet light, for provisionally curing the ink to an extent whereby adjacent droplets do not combine together after ink droplets ejected from the inkjet head 24 have landed on the recording medium 12. The ink onto which an active light beam, such as ultraviolet light, has been emitted from the provisional curing light sources 32A, 32B is provisionally cured to an extent which avoids landing interference while allowing expansion of the dots (allowing the dots to spread sufficiently).

The main curing light sources 34A, 34B are light sources which perform additional exposure after provisional curing and which emit an active light beam, such as ultraviolet light, for finally curing the ink completely (main curing). The main curing light sources 34A, 34B are light sources which perform a follow-up exposure after the active light beam such as ultraviolet light has been emitted from the provisional curing light sources 32A, 32B onto the ink on the recording medium 12, and which finally emit the active light beam such as ultraviolet light for full curing (main curing) of the ink.

The inkjet head 24, the provisional curing light sources 32A, 32B and the main curing light sources 34A, 34B disposed on the carriage 30 move in unison with (together with) the carriage 30 along the guide mechanism 28. The reciprocal movement direction (Y direction) of the carriage 30 corresponds to the "main scanning direction" and the conveyance direction (X direction) of the recording medium 12 corresponds to the "sub-scanning direction".

Various media may be used for the recording medium 12, without any restrictions on the material, such as paper, unwoven cloth, vinyl chloride, compound chemical fibers, polyethylene, polyester, tarpaulin, or the like, or whether the medium is permeable or non-permeable. The recording medium 12 is supplied in a rolled state (see FIG. 2) from the rear surface of the apparatus, and after printing, the medium is rolled onto a take-up roller on the front side of the apparatus (not shown in FIG. 1 but shown buy reference numeral 44 in FIG. 2). Ink droplets are ejected from the inkjet head 24 onto the recording medium 12 which is conveyed on the platen 26, and a active light beam such as ultraviolet light is emitted from the provisional curing light sources 32A, 32B and the main curing light sources 34A, 34B onto ink droplets which have been deposited onto the recording medium 12.

In FIG. 1, the installation section 38 of an ink cartridge 36 is provided on the left-side front face of the apparatus main body 20 when the apparatus is viewed from the front. The ink cartridge 36 is an replaceable ink supply source (ink tank) which stores a radiation beam (active light beam)-curable ink. The ink cartridge 36 is provided so as to correspond to respective inks which are used in the inkjet recording apparatus 10 of the present example. The respective ink cartridges 36 of each color are respectively connected by ink supply channels (not illustrated), which are formed independently, to the inkjet head 24. The ink cartridges 36 are replaced when the remaining amount of ink of the respective colors has become low.

Although not shown in the drawings, a maintenance unit for the inkjet head 24 is provided on the right-hand side of the apparatus main body 20 as viewed from the front side. This maintenance unit includes a cap for keeping the inkjet head 24 moist when not printing, and a wiping member (blade, web, etc.) for cleaning the nozzle surface (ink ejection surface) of the inkjet head 24. The cap which caps the nozzle surface of the inkjet head 24 is provided with an ink receptacle for receiving ink droplets ejected from the nozzles for the purpose of maintenance.

(Description of Recording Medium Conveyance Path)

Figure 2:
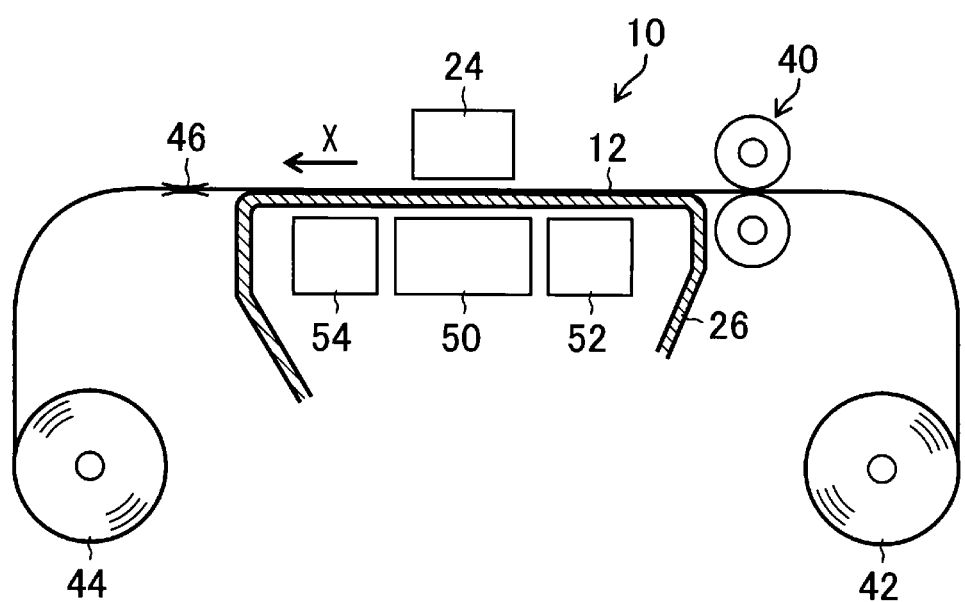
FIG. 2 is an illustrative diagram which shows a schematic drawing of a paper conveyance path in the inkjet recording apparatus shown in FIG. 1.

FIG. 2 is an illustrative diagram showing a schematic view of the recording medium conveyance path in the inkjet recording apparatus 10. As shown in FIG. 2, the platen 26 is formed in an inverted gutter shape and the upper surface thereof is a supporting surface (medium supporting surface) for a recording medium 12. A pair of nip rollers 40 which form a recording medium conveyance device for intermittently conveying the recording medium 12 are provided on the upstream side of the platen 26 in the recording medium conveyance direction (X direction), in the vicinity of the platen 26. These nip rollers 40 move the recording medium 12 in the recording medium conveyance direction over the platen 26.

The recording medium 12 which is output from a supply side roll (pay-out supply roll) 42 that constitutes a roll-to-roll type medium conveyance device is conveyed intermittently in the recording medium conveyance direction by the pair of nip rollers 40 which are provided in an inlet opening of the print unit (on the upstream side of the platen 26 in terms of the recording medium conveyance direction). When the recording medium 12 has arrived at the print unit directly below the inkjet head 24, printing is carried out by the image forming unit 23, and the recording medium is then wound up onto a take-up roll 44 after printing. A guide 46 for the recording medium 12 is provided on the downstream side of the print unit in the recording medium conveyance direction.

A temperature adjustment unit 50 for adjusting the temperature of the recording medium 12 during printing is provided on the rear surface (an opposite surface to the surface supporting the recording medium 12) of the platen 26 at a position opposing the inkjet head 24 in the print unit. When the recording medium 12 is adjusted to a prescribed temperature during printing, the viscosity, surface tension, and other physical properties, of the ink droplets deposited onto the recording medium 12, assume prescribed values and it is possible to obtain a desired dot diameter. According to requirements, it is possible to provide a heat pre-adjustment unit 52 on the upstream side of the temperature adjustment unit 50 or to provide a heat after-adjustment unit 54 on the downstream side of the temperature adjustment unit 50.

(Constitution of Image Forming Unit)

Figure 3:
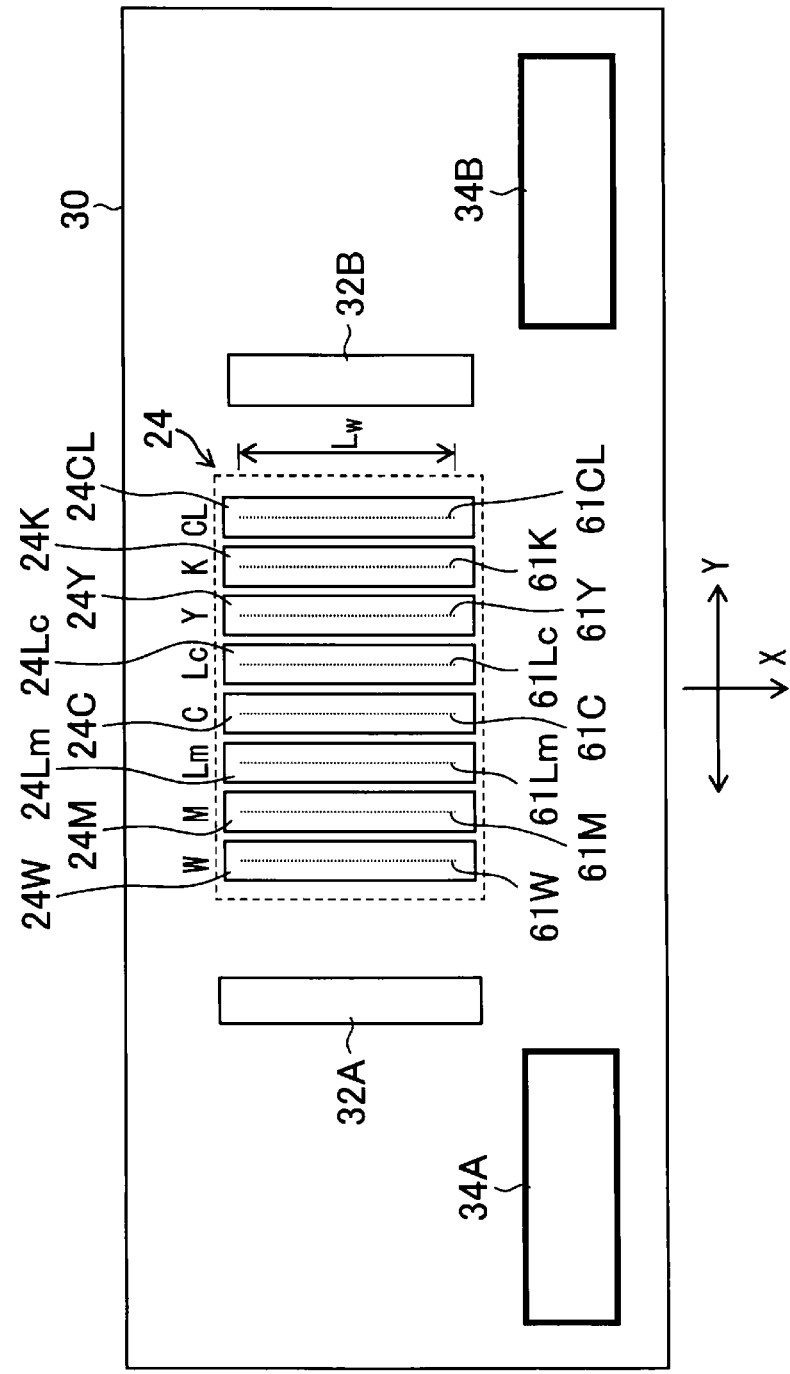
FIG. 3 is a plan view perspective diagram showing an example of constitution of the inkjet head shown in FIG. 1.

FIG. 3 is a plan view perspective diagram showing an example of an arrangement of the inkjet head 24, the provisional curing light sources 32A, 32B, and the main curing light sources 34A, 34B which are arranged on the carriage 30.

Nozzle rows 61W, 61M, 61Lm, 61C, 61Lc, 61Y, 61K, 61CL are provided in the inkjet head 24 for ejecting inks of the respective colors of white ink (W) (CL), yellow (Y), magenta (M), cyan (C), black (K), light cyan (Lc), light magenta (Lm) and clear (transparent) ink. In FIG. 3, the nozzle rows are indicated by dotted lines, and individual nozzles are not depicted. Furthermore, in the following description, the nozzle rows 61W, 61M, 61Lm, 61C, 61Lc, 61Y, 61K and 61CL are referred to generally by the reference numeral 61.

The types of ink color (number of colors) and the combination of colors are not limited to the present embodiment. For example, it is also possible to adopt a mode where the Lc and Lm nozzle rows are omitted, a mode where either CL nozzle rows or W nozzle rows are omitted, a mode where a nozzle row for metal ink is added, a mode where a nozzle row for metal ink is provided instead of the W nozzle row, or a mode where a nozzle row which ejects ink of a special color is added. Moreover, the arrangement sequence of the nozzle rows of the respective colors are not limited in particular. However, a desirable composition is one in which ink having a low curing sensitivity in response to an active light beam, of the plurality of ink types, is arranged in close proximity to the provisional curing light source 32A or the provisional curing light source 32B.

An inkjet head 24 capable of color image formation can be composed by forming a head module for the nozzle row 61 of each color and arranging these head modules together. For example, it is possible to adopt a mode in which a head module 24Y having a nozzle row 61Y which ejects yellow ink, a head module 24M having a nozzle row 61M which ejects magenta ink, a head module 24C having a nozzle row 61C which ejects cyan ink, a head module 24K having a nozzle row 61K which ejects black ink, and head modules 24Lc, 24Lm, 24CL, 24W respectively having nozzle rows 61Lc, 61Lm, 61CL, 61W which eject inks of respective colors of Lc, Lm, CL and W, are arranged equidistantly in the direction of reciprocal movement of the carriage 30 (the main scanning direction, Y direction). A module group (head group) constituted by the head modules 24M, 24Lm, 24C, 24Lc, 24Y, 24K of the respective colors can each be interpreted as an "inkjet head", or each module can be interpreted respectively as an "inkjet head". Alternatively, it is also possible to adopt a mode in which the ink flow channels are divided according to color inside one inkjet head 24, and nozzle rows which eject inks of a plurality of colors are provided in one head.

In each of the nozzle rows 61, a plurality of nozzles are arranged in one row (one straight line) in the direction of conveyance of the recording medium (the sub-scanning direction, X direction) at a uniform interval apart. In the inkjet head 24 according to the present embodiment, the arrangement pitch of the nozzles which make up the nozzle rows 61 (nozzle pitch) is 254 μm (100 dpi), the number of nozzles which constitute one nozzle row 61 is 256 nozzles, and the total length $L_w$ of the nozzle row 61 (the total length of the nozzle rows) is approximately 65 mm (254 μm×255=64.8 mm) Furthermore, the ejection frequency is 15 kHz, and ejection droplet volumes of three types, 10 pl, 20 pl, 30 pl, can be ejected selectively, by changing the drive waveform.

Although the details are described below, a multi-pass method is used for image recording by the inkjet recording apparatus 10 shown in the present embodiment. Furthermore, the exposure by the provisional curing light sources 32A, 32B and the main curing light sources 32A, 32B is controlled in accordance with image recording based on a multiple pass method.

(Structure of Inkjet Head)

Figure 4A:
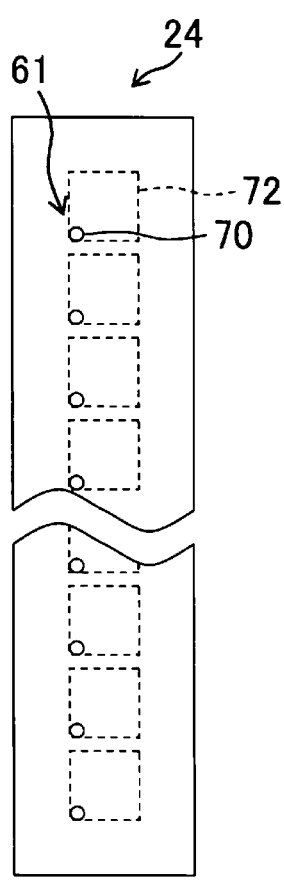
FIGS. 4A and 4B are plan diagrams of an ink ejection surface which shows a nozzle arrangement in an inkjet head.
Figure 4B:
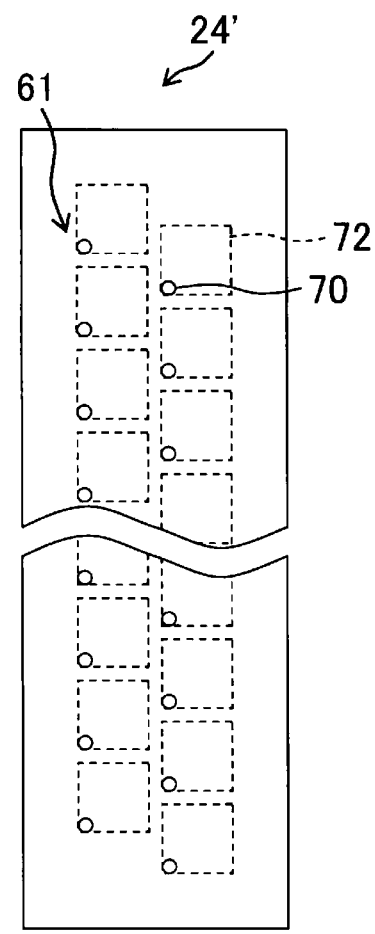

FIG. 4A is a plan view perspective drawing showing a nozzle arrangement in an inkjet head 24, and depicts a mode where a nozzle row 61 for one color constitutes one head module 24. As shown in FIG. 4A, the nozzle row 61 for one color has nozzles 70 arranged in one row along a sub-scanning direction. The nozzles 70 are connected to pressure chambers 72 (indicated by dotted lines) which accommodate ink that is to be ejected. As shown in FIG. 4B, it is also possible to adopt a mode in which nozzles 70 are arranged in a two-row staggered arrangement.

Figure 5:
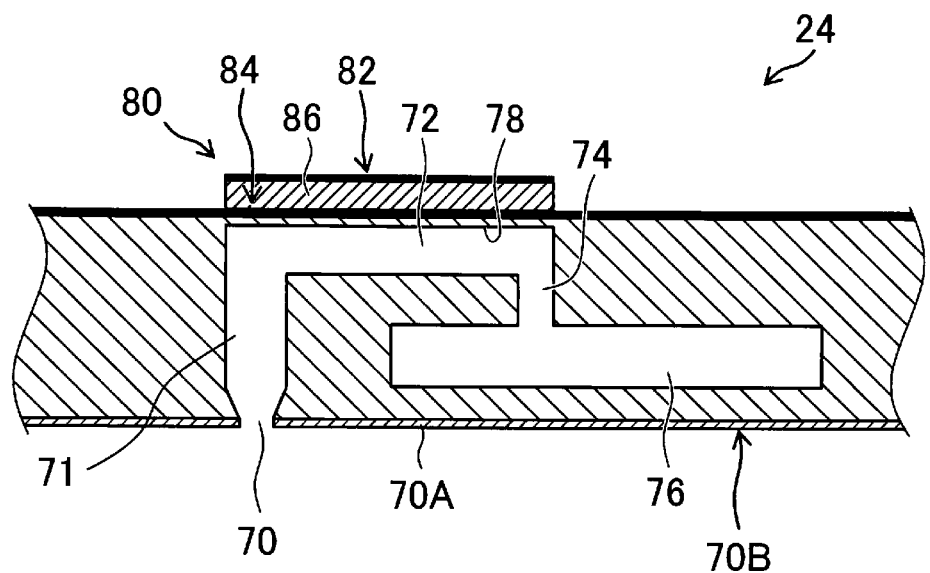
FIG. 5 is a cross-sectional diagram showing an internal structure of an inkjet head.

FIG. 5 is a cross-sectional diagram showing a three-dimensional structure of an inkjet head 24, and depicts a structure corresponding to one nozzle (one ejection element). The ink ejection method of the inkjet head 24 used in the present embodiment may employ a method (piezo jet method) which propels ink droplets by deformation of a piezoelectric element (a piezo actuator). The radiation beam (active light beam)-curable ink generally has higher viscosity than solvent-based ink, and therefore is advantageous in a piezo jet system which has a relatively large ejection force.

It is also possible to adopt a thermal method in which a heater for heating ink inside a pressure chamber 72 is provided and ink is ejected from a nozzle 70 using an ink film boiling phenomenon.

As well as each being connected to a nozzle 70 via a nozzle flow channel 71, the pressure chambers 72 are also connected to a common flow channel 76 via a supply port (supply restrictor) 74. The common flow channel 76 is connected to the respectively corresponding pressure chambers 72 of the nozzles 70 which constitute the nozzle row 61 of one color (see FIG. 3) and supplies ink to the pressure chambers 72.

Piezoelectric elements 80 are provided on a diaphragm 78 which constitutes a ceiling surface of the pressure chambers 72, at positions corresponding to the pressure chambers 72 on the surface to the outside of the pressure chambers 72. The piezoelectric elements 80 each have a structure in which a piezoelectric body is sandwiched between an upper electrode 82 and a lower electrode 84, and generate a distorting deformation, thereby causing the diaphragm 78 to deform, when a drive voltage is supplied between the upper electrode 82 and the lower electrode 84.

When a drive voltage is supplied to a piezoelectric element 80 in accordance with the image data, the diaphragm 78 deforms and the volume of the pressure chamber 72 is reduced, whereby ink of a volume corresponding to the volume reduction of the pressure chamber 72 is ejected from the nozzle 70. When supply of the drive voltage to the piezoelectric element 80 is halted, the distorting deformation of the piezoelectric element 80 is restored, the pressure chamber 72 reverts to its original shape, and ink is filled into the pressure chamber 72 from the common flow channel 76 via the supply port 74.

The ink ejection surface 70B of the nozzle plate 70A of the inkjet head 24 has lyophilic properties. The method of lyophilization processing may be a method which forms one or more non-ink-repelling layers on at least a portion of the ink ejection surface 70B of the nozzle plate 70A.

More specifically, in at least one portion of the ink ejection surface 70B, it is desirable to provide a layer formed by at least one material selected from a group consisting of: gold, stainless steel, iron, titanium, tantalum, platinum, rhodium, nickel, chrome, silicon oxide, silicon nitride and aluminum nitride, it is more desirable to provide a layer formed by at least one material selected from a group consisting of: gold, stainless steel, iron, titanium, silicon oxide, silicon nitride and aluminum nitride; it is even more desirable to provide a layer formed by at least one material selected from a group consisting of gold, stainless steel and silicon oxide; and it is preferable to provide a layer formed by silicon oxide.

The lyophilic treatment method can use a commonly known method and although not restricted in particular, may be, for instance (1) a method which forms a silicon oxide film by thermal oxidization of the surface of a silicon nozzle plate; (2) a method which forms an oxide film of silicon or a material other than silicon, oxidatively; or (3) a method which forms a metal layer. The details of these methods can be referred to in US Patent Application Publication No. 2010/0141709.

(Ink Supply System)

Figure 6:
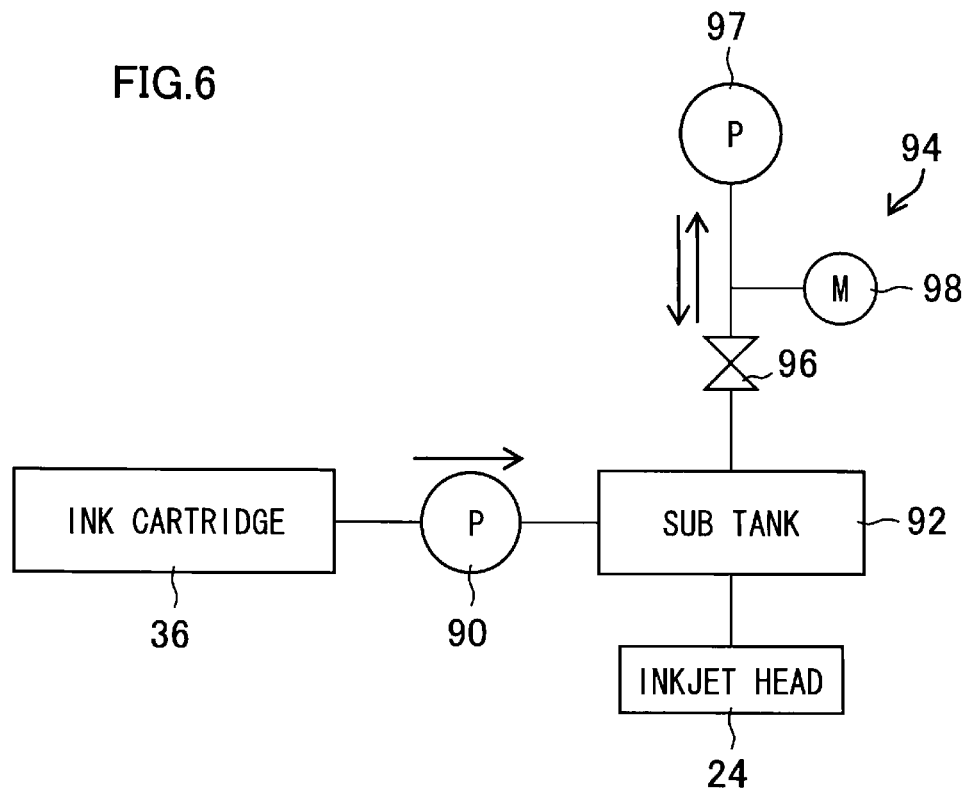
FIG. 6 is a block diagram showing a configuration of an ink supply system of the inkjet recording apparatus shown in FIG. 1.

FIG. 6 is a block diagram showing a configuration of an ink supply system of the inkjet recording apparatus 10. As shown in FIG. 6, ink accommodated in an ink cartridge 36 is suctioned by the supply pump 90, and is conveyed to the inkjet head 24 via a sub-tank 92. In the sub-tank 92, a pressure adjustment unit 94 for adjusting the pressure of the ink therein is provided.

The pressure adjustment unit 94 includes a pressure reducing pump 97 which is connected to the sub tank 92 by means of a valve 96, and a pressure gauge 98 which is provided between the valve 96 and the pressure reducing pump 97.

During normal printing, the pressure reducing pump 97 operates in a direction which suctions ink inside the sub-tank 92, and keeps a negative pressure inside the sub-tank 92 and a negative pressure inside the inkjet head 24. On the other hand, during maintenance of the inkjet head 24, the pressure reducing pump 77 is operated in a direction which increases the pressure of the ink inside the sub tank 92, thereby forcibly raising the internal pressure of the sub-tank 92 and the internal pressure of the inkjet head 24, and ink inside the inkjet head 24 is expelled via nozzles. The ink which has been forcibly expelled from the inkjet head 24 is accommodated in the ink receptacle of the cap (not shown) described above.

In the inkjet recording apparatus 10 described in the present embodiment, the ink temperature is adjusted so as to be kept within a uniform range, in the ink supply system shown in FIG. 6. As a compositional example for keeping a uniform ink temperature, e.g., a temperature of ink in the sub-tank 92, a temperature sensor and heater are provided in an ink flow channel which supplies ink from a sub tank 92 to the inkjet head 24, and a heater is operated on the basis of the determination results of the temperature sensor.

Furthermore, a desirable mode is one in which the portion where ink passes from the ink cartridge 36 to the inkjet head 24 is covered with a heat insulating material, in such a manner that the ink is not affected by external temperature changes.

Moreover, a desirable mode is one where a heater is provided inside the inkjet head 24 and the temperature is managed inside the inkjet head 24.

In the inkjet recording apparatus shown in the present embodiment, the ink viscosity at 25° C. is adjusted so as to be no more than 50 mPa·sec, and ejection stability is ensured. For example, the ink is heated from 25° C. to 80° C., in such a manner that the ink viscosity changes from 3 mPa·sec to 15 mPa·sec. More desirably, the ink is heated to 25 to 50° C., in such a manner that the ink viscosity changes from 3 mPa·sec to 13 mPa·sec.

The radiation beam (active light beam)-curable ink composition used in the present invention has a higher viscosity than an aqueous ink composition which is generally used as an ink composition for normal inkjet recording, and therefore the variation in viscosity due to variation in temperature at ejection is large. The variation in the viscosity of the ink composition greatly affects the change in the droplet size and the change in the droplet ejection speed, and therefore gives rise to deterioration in image quality. Consequently, it is necessary to keep the temperature of the ink component as uniform as possible during ejection.

Therefore, the control range of the ink temperature is desirably within ±5° C. of the set temperature, more desirably, within ±2° C. of the set temperature, and even more desirably, within ±1° C. of the set temperature. The ink temperature is managed by a control system, which is described below.

(Constitution of Inkjet Recording Apparatus Control System)

Figure 7:
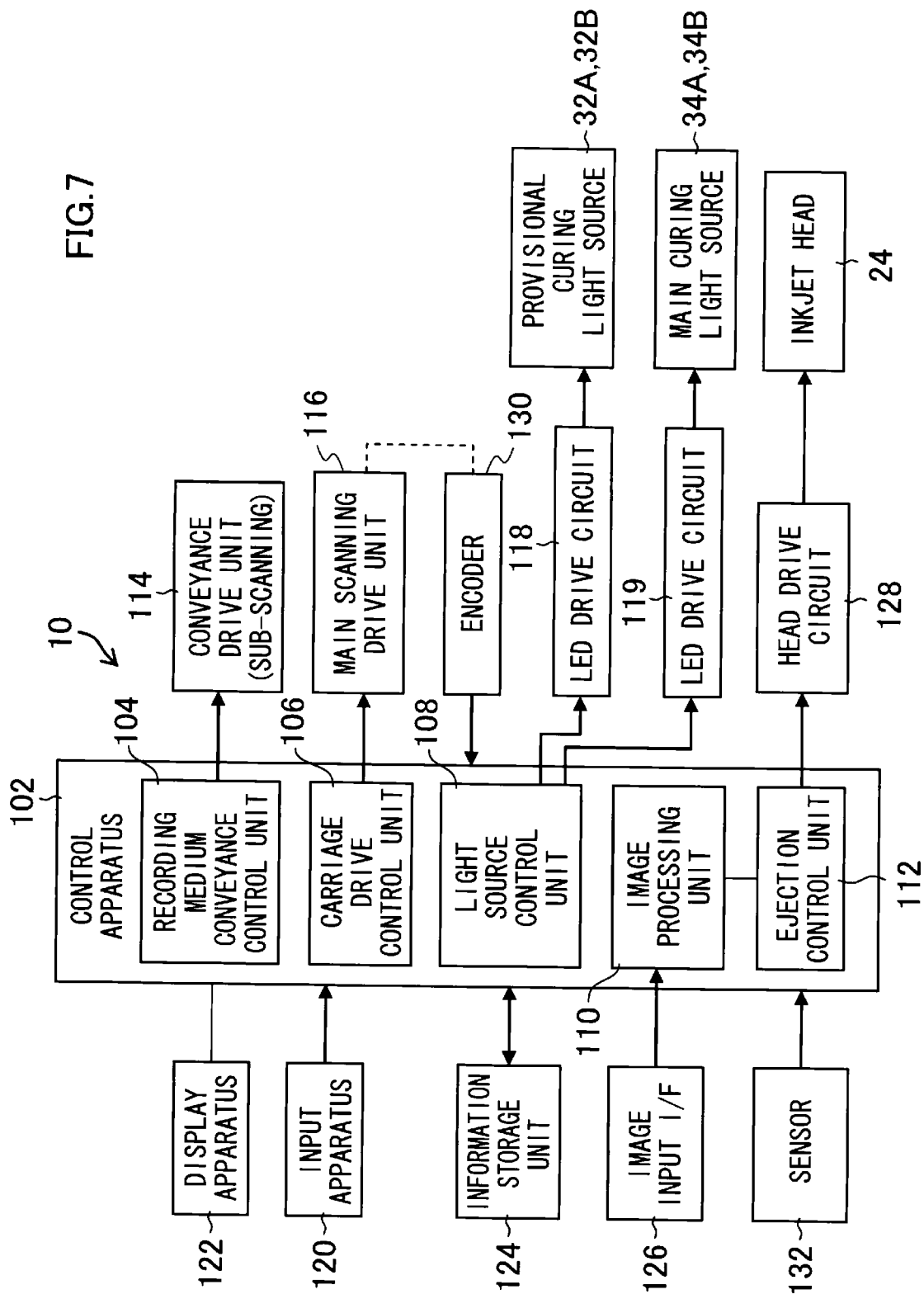
FIG. 7 is a block diagram showing a principal composition of the control system of the inkjet recording apparatus shown in FIG. 1.

FIG. 7 is a block diagram showing the main constitution of a control system of an inkjet recording apparatus 10 relating to an embodiment of the present invention. As shown in FIG. 7, the inkjet recording apparatus 10 is provided with a control apparatus 102 as a control device.

For this control apparatus 102, it is possible to use, for example, a computer equipped with a central processing unit (CPU), or the like. The control apparatus 102 functions as a control apparatus for controlling the whole of the inkjet recording apparatus 10 in accordance with a prescribed program, as well as functioning as a calculation apparatus for performing respective calculations. The control apparatus 102 includes a recording medium conveyance control unit 104, a carriage drive control unit 106, a light source control unit 108, an image processing unit 110, and an ejection control unit 112. These respective units are achieved by a hardware circuit or software, or a combination of these.

The recording medium conveyance control unit 104 controls the conveyance drive unit 114 for conveying the recording medium 12 (see FIG. 1). The conveyance drive unit 114 includes a drive motor which drives the nip rollers 40 shown in FIG. 2, and a drive circuit thereof. The recording medium 12 which is conveyed on the platen 26 (see FIG. 1) is conveyed intermittently in the sub-scanning direction, in accordance with a reciprocal scanning action (printing pass action) in the main scanning direction performed by the inkjet head 24.

The carriage drive control unit 106 shown in FIG. 7 controls the main scanning drive unit 116 for moving the carriage 30 (see FIG. 1) in the main scanning direction. The main scanning drive unit 116 includes a drive motor which is connected to a movement mechanism of the carriage 30, and a control circuit thereof. The light source control unit 108 is a control device which controls emission of light by the UV-LED elements (not illustrated in FIG. 7) of the provisional curing light sources 32A, 32B via the LED drive circuit 118, as well as controlling emission of light by the UV-LED elements of the main curing light sources 34A, 34B via the LED drive circuit 119. Furthermore, the light source control unit 108 also controls the switching on and switching off of the provisional curing light sources 32A, 32B. The switching on and switching off of the provisional curing light sources 32A, 32B is controlled in such a manner that the provisional curing light source on the rear side in terms of the direction of travel of the scanning direction is switched off and that on the front side is switched on. Therefore, the switching on and off of the provisional curing light sources is controlled in such a manner that the switching on and switching off of the provisional curing light sources is opposite, in the outward movement and return movement of the reciprocal scanning movement of the carriage 30.

An input apparatus 120, such as an operating panel, and a display apparatus 122, are connected to the control apparatus 102. The input apparatus 120 is a device by which manually performed external operating signals are input to the control apparatus 102, and may employ various formats, such as a keyboard, a mouse, a touch panel, or operating buttons, or the like. The display apparatus 122 may employ various formats, such as a liquid crystal display, an organic EL display, a CRT, or the like. An operator is able to select an image formation mode, input print conditions, and input and edit additional conditions, and the like, by operating the input apparatus 120, and is able to confirm the input details and various information such as search results, via the display on the display apparatus 122.

Furthermore, an information storage unit 124 which stores various information and an image input interface 126 for acquiring image data for printing are provided in the inkjet recording apparatus 10. It is possible to employ to this interface a serial interface or a parallel interface for the image input interface. It is also possible to install a buffer memory (not illustrated) for achieving high-speed communications.

The image data input via the image input interface 126 is converted into data for printing (dot data) by the image processing unit 110. In general, the dot data is generated by subjecting the multiple-tone image data to color conversion processing and half-tone processing. The color conversion processing is processing for converting image data represented by an sRGB system (for example, 8-bit RGB image data of respective colors of RGB) into image data of the respective colors of ink used by the inkjet recording apparatus 10.

A half-toning process is processing for converting the color data of the respective colors generated by the color conversion processing into dot data of respective colors by error diffusion, a threshold value matrix, or the like. The device carrying out the half-toning process may employ commonly known methods of various kinds, such as an error diffusion method, a dithering method, a threshold value matrix method, a density pattern method, and the like. The half-toning process generally converts graduated image data having M values (M≥3) into graduated image data having N values (N<M). In the simplest example, the image data is converted into dot image data having binary values (dot on/dot off), but in a half-toning process, it is also possible to perform quantization in multiple values which correspond to different types of dot size (for example, three types of dot: a large dot, a medium dot and a small dot).

The binary or multiple-value image data (dot data) obtained in this way is used for driving (on) or not driving (off) the respective nozzles, or in the case of multiple-value data, is used as ink ejection data (droplet control data) for controlling the droplet volume (dot size).

The ejection control unit 112 generates an ejection control signal for the head drive circuit 128 on the basis of dot data generated in the image processing unit 110. Furthermore, the ejection control unit 112 includes a drive waveform generation unit (not shown). The drive waveform generation unit is a device which generates a voltage waveform of a drive voltage for driving the ejection energy generation elements (in the present embodiment, piezo elements) which correspond to the respective nozzles of the inkjet head 24.

The drive waveform data is stored previously in the information storage unit 124 and drive waveform data to be used is output as and when required. The drive waveform output from the drive waveform generation unit is supplied to the head drive circuit 128. The signal output from the drive waveform generation unit may be digital waveform data or an analog voltage signal.

Ink is ejected from the corresponding nozzles by applying a common drive voltage signal to the ejection energy generation devices of the inkjet head 24 via the head drive circuit 128 and switching the switching elements (not illustrated) which are connected to the individual electrodes of the energy generating elements on and off in accordance with the ejection timings of the respective nozzles.

Programs to be executed by the CPU of the control apparatus 102 and various data required for control purposes are stored in the information storage unit 124. The information storage unit 124 stores resolution settings information corresponding to the image formation mode, the number of passes (number of scanning repetitions), information necessary for controlling sub-scanning amount, and control information for the provisional curing light sources 32A, 32B, and the main curing light sources 34A, 34B, and the like.

An encoder 130 is attached to the drive motor of the main scanning drive unit 116 and the drive motor of the conveyance drive unit 114, and outputs a pulse signal corresponding to the amount of rotation and the speed of rotation of the drive motor, this pulse signal being supplied to the control unit 102. The position of the carriage 30 and the position of the recording medium 12 (see FIG. 1) are ascertained on the basis of the pulse signal output from the encoder 130.

The sensor 132 includes sensors which are provided on the respective parts of the apparatus. For example, the width of the recording medium 12 is ascertained on the basis of the sensor signal obtained by the sensor 132, using a sensor for determining a width of the recording medium 12 which is installed on the carriage 30.

A further example of the sensor 132 is a temperature sensor which determines a temperature of the ink, a position determination sensor which determines a position of the recording medium, a pressure sensor, and so on. For example, the control apparatus 102 sends a command signal to the heater control unit (not illustrated), on the basis of ink temperature information obtained from the temperature sensor which determines the ink temperature, and the heater control unit controls operation of the heater on the basis of an instruction signal from the control apparatus 102. The composition shown in FIG. 7 can be suitably modified, added or deleted.

(Description of Image Formation Method Based on Multi-Pass Printing Method)

Next, an image formation method based on a multi-pass printing method will be described. Droplet ejection is performed from the nozzles when the inkjet head 24 is moved in the main scanning direction (the Y direction in FIG. 1). Two-dimensional image formation is carried out on the recording medium by a combination of reciprocal movement of the head 24 in the main scanning direction and intermittent conveyance of the recording medium in the sub-scanning section (the X direction in FIG. 2).

When an image of a desired recording resolution is completed by N scans (scanning actions), the paper is conveyed intermittently for the first scan, the second scan, the third scan, and so on, in such a manner that the paper arrives at a position corresponding exactly to the length of the head (nozzle row) by the N+1th scanning action. In order that the N image forming operations are linked seamlessly, N+1 scanning actions are carried out by moving through "nozzle row length+1 nozzle pitch" in the sub-scanning direction, from the sub-scanning position of the first scanning action.

[Provisional Curing Light Sources]

In the present embodiment, of the provisional curing light sources 32A, 32B and the main curing light sources 34A, 34B which are arranged on the left and right-hand sides of the carriage 30 which moves in a direction perpendicular to the recording medium conveyance direction, the light sources on the rear side of the travel direction of the carriage 30 are switched off. In other words, in FIG. 1, when the carriage 30 is moved from right to left in order to form an image (outward path), main scanning is carried out with the provisional curing light source 32B on the right side in a switched off state. When the carriage 30 is moved from left to right (return path), main scanning is performed with the provisional curing light source 32A on the left side in a switched off state.

Furthermore, in unidirectional printing in which droplet ejection is carried out during movement of the carriage 30 from right to left only (outward path), the provisional curing light source 32B on the right side is switched off when the carriage 30 is moved from right to left. In movement from left to right (return path), it is possible to switch on the provisional curing light sources 32A, 32B on either side at the same brightness, or the provisional curing light source 32A on the left side may be switched off, or the provisional curing light source 32B on the right side may be switched off, symmetrically with the outward path.

In this way, by switching off the provisional curing light source 32A or 32B situated immediately after droplet ejection, it is possible to lengthen the time until the ejected ink droplets receive exposure of UV light by the provisional curing light source 32A or 32B. Consequently, the UV emission can be carried out and the ink can be cured in a state where the leveling of the ejected ink droplets has progressed, and therefore the occurrence of wrinkles can be suppressed, and hence it is possible to improve the overall glossiness of the image.

The time until provisional curing by the provisional curing light sources 32A, 32B after the ejection of ink droplets is desirably set to approximately 0.1 seconds to 3 seconds. The time from the ejection of droplets until provisional curing can be specified in accordance with the specifications of the apparatus that is used. For example, in the case of specifications such as those shown in FIG. 8, the time can be determined as described below.

The nozzle rows of the inkjet head are arranged in the order W, Lm, K, C, M, Y, Lc, CL from the left of the front surface, and the interval therebetween is 27 mm. The distance from the provisional curing light sources 32A, 32B to the nozzle row 61 of the color ink which is closest to the provisional curing light sources 32A, 32B is 100+27=127 mm, and the distance to the nozzle row 61 of the most distant color ink is 100+27× 6=262 mm. If there are provisional curing light sources 32A, 32B on the left and right sides, and both sides are switched on, then since the main scanning speed is 1270 mm/s or 1355 mm/s, then the time until provisional curing immediately after droplet ejection is 127/1355 0.1 sec at shortest, and 262/1270 0.21 sec at longest.

Figure 8A:
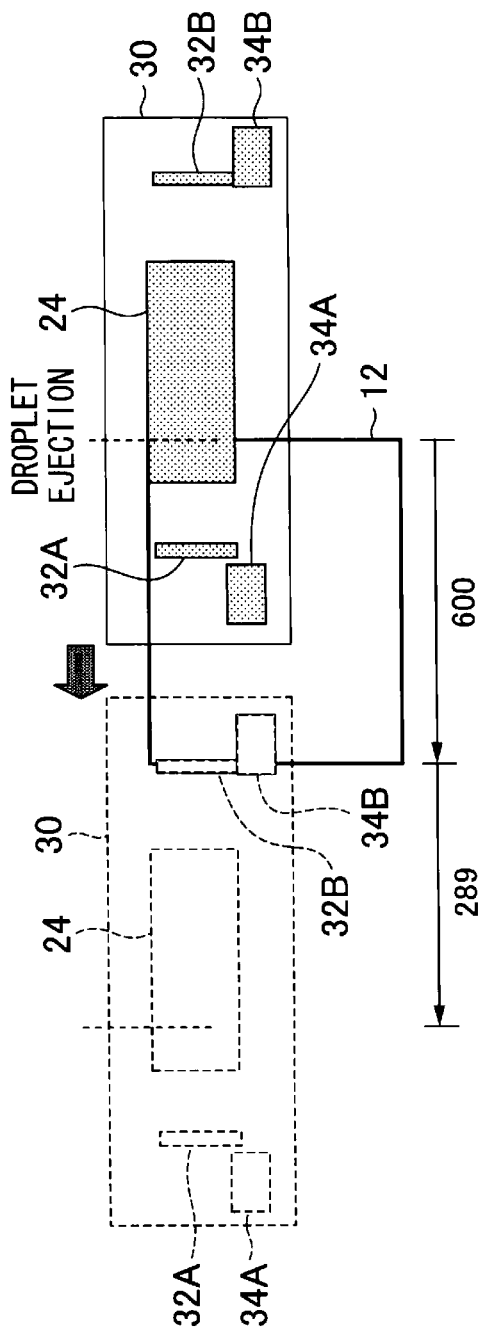
FIGS. 8A and 8B are diagrams illustrating a time period from ink droplet ejection until provisional curing, when a carriage is moved through a width of a recording medium.
Figure 8B:
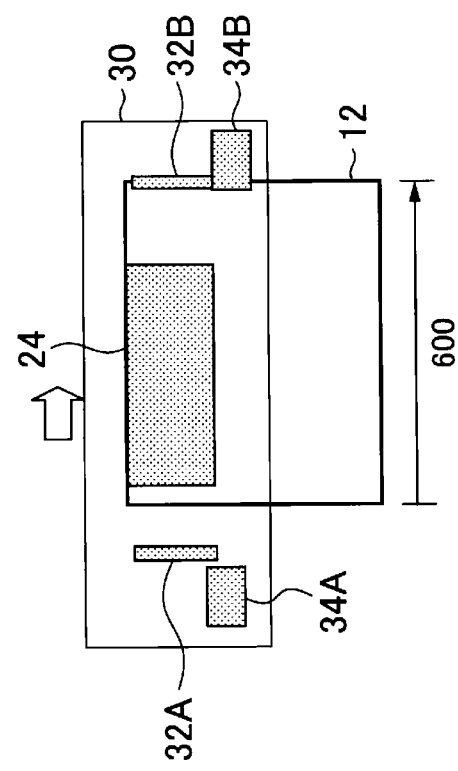

On the other hand, in the present embodiment, as shown in FIG. 8A, if the carriage 30 is moved from right to left in FIG. 8A (when the inkjet recording apparatus 10 is viewed from above), then droplet ejection is carried out with only the provisional curing light source 32A on the left side of the carriage 30 in a switched on state. If the droplet ejection action performs a scanning action over the width of the recording medium 12 (width 600, longest edge of A2 paper), then the movement from right to left covers a distance of the width of the recording medium (600 mm)+[nozzle alignment width pitch (27 mm)×number of nozzle rows (7)−1]+distance between nozzles and provisional curing light source (127 mm)=889 mm. Next, the carriage 30 starts to move from left to right. In this case, contrary to the case where the carriage is moved from right to left, the provisional curing light source 32B which is on the front side in the direction of travel in the main scanning direction is switched on, and the provisional curing light source 32A is switched off. FIG. 8B is a diagram showing a case where the carriage has been moved in order to provisionally cure the ejected ink droplets in FIG. 8A. As shown in FIG. 8B, since the ejected droplets of ink are provisionally cured by the provisional curing light source 32B, it is possible to carry out provisional curing by moving the carriage 30 through a length (600 mm) corresponding to the width of the recording medium. Consequently, if the scanning distance of the carriage shown in FIG. 8 is the width of the recording medium, then the scanning distance is 889 (mm)+ 600 (mm)=1489 (mm), and the time from droplet ejection until provisional curing is 1489 (mm)/1355 (mm/s)≈1.10 s if the carriage scanning speed is fast (1355 (mm/s)), and hence emission is carried out after approximately 1.1 seconds.

Figure 9A:
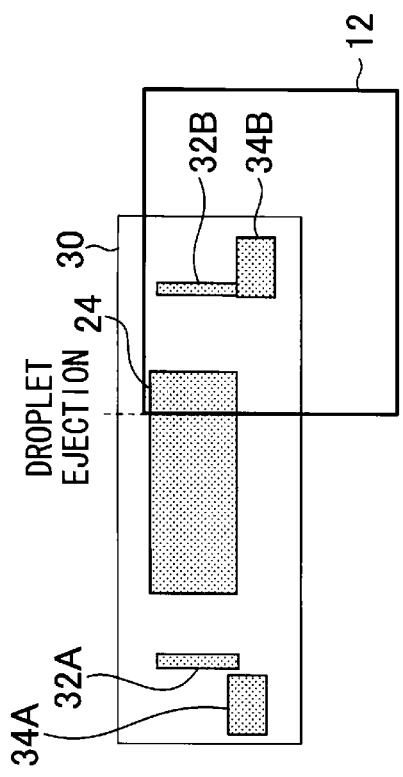
FIGS. 9A and 9B are diagrams illustrating a time period from ink droplet ejection until provisional curing, when a carriage is moved through a width of a recording medium.
Figure 9B:
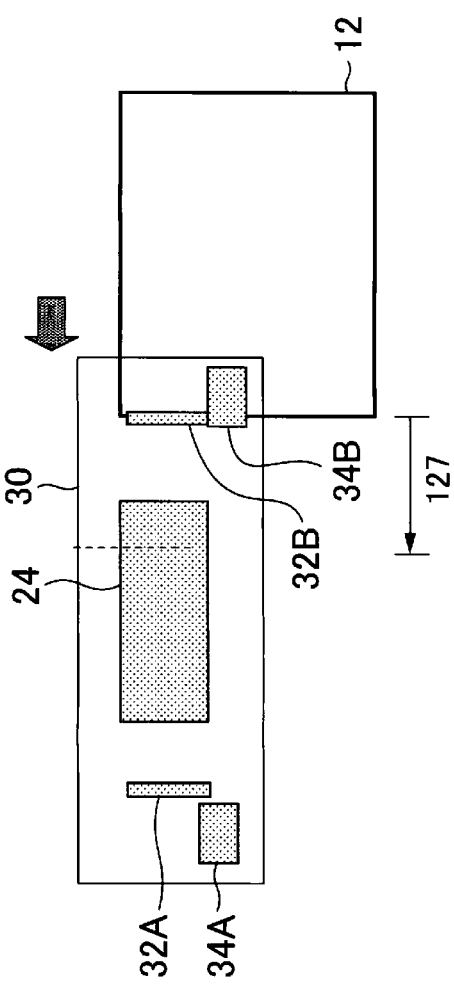
Figure 11A:
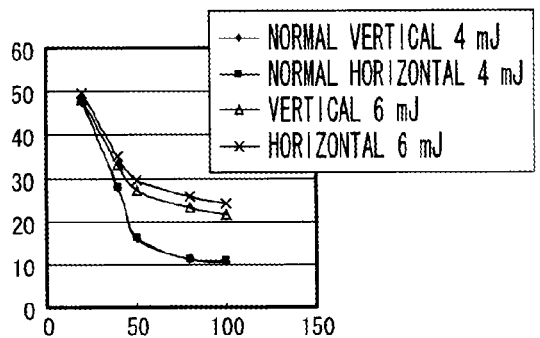
FIGS. 11A to 11F are graphs showing a relationship between a halftone percentage (%) and glossiness (%) in a case of unidirectional printing.
Figure 11B:
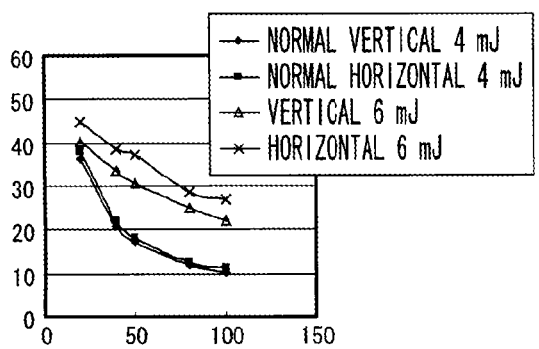
Figure 11C:
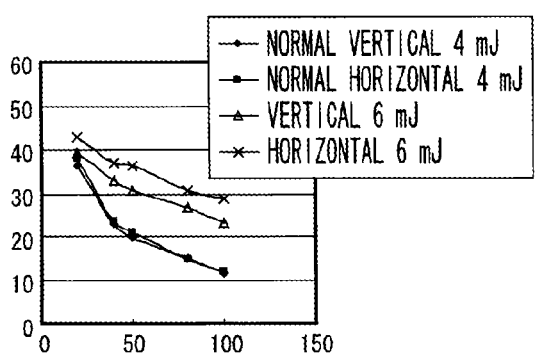
Figure 11D:
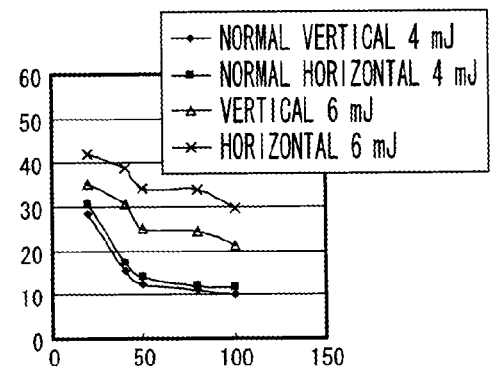
Figure 11E:
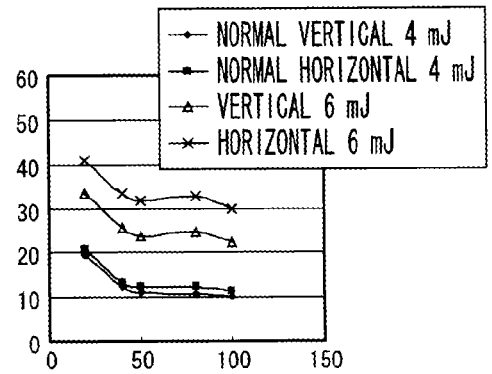
Figure 11F:
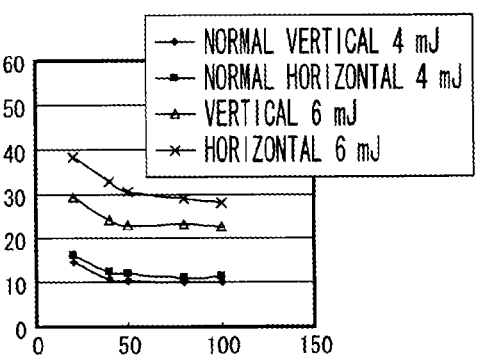
Figure 12A:
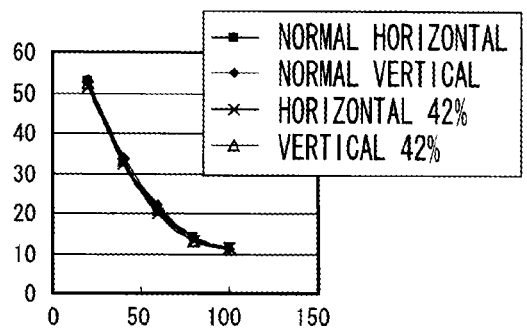
FIGS. 12A to 12F are graphs showing a relationship between a halftone percentage (%) and glossiness (%) in a case of bi-directional printing, when the brightness on the rear side of the direction of travel was reduced to 42% of the brightness on the front side.
Figure 12B:
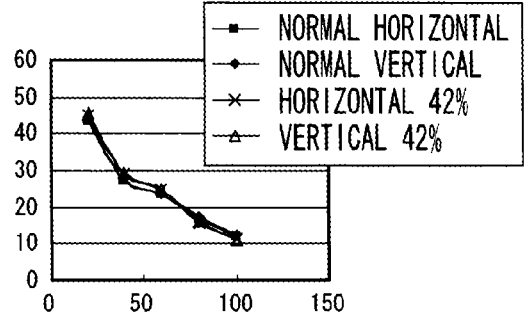
Figure 12C:
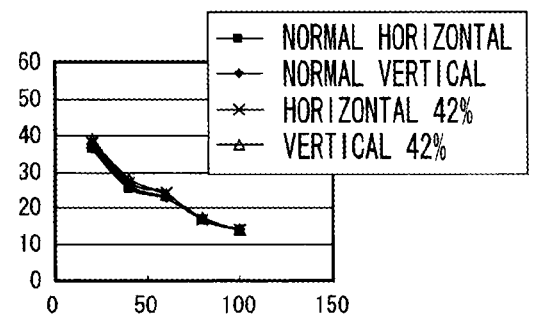
Figure 12D:
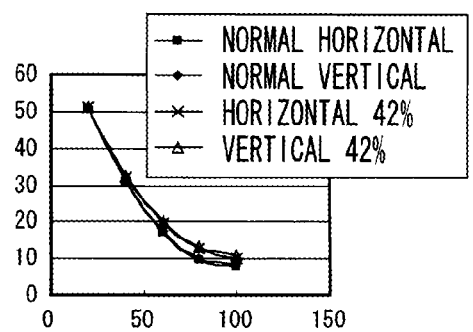
Figure 12E:
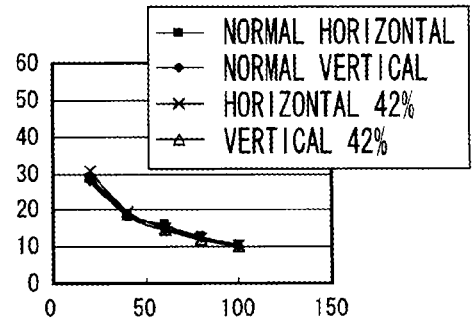
Figure 12F:
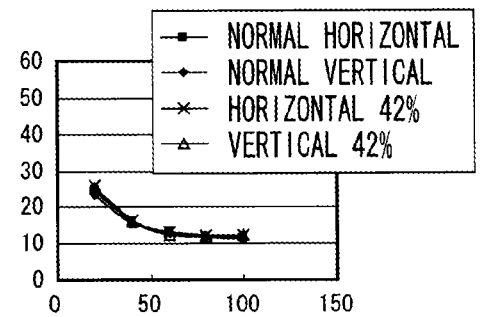
Figure 13A:
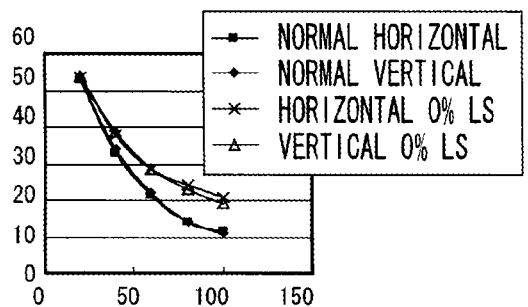
FIGS. 13A to 13F are graphs showing a relationship between a halftone percentage (%) and glossiness (%) in a case of bidirectional printing, when the carriage was moved through the width of the recording medium.
Figure 13D:
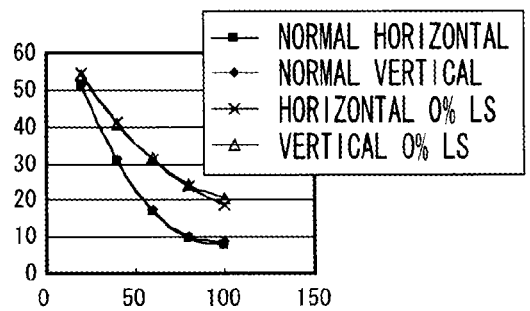
Figure 13B:
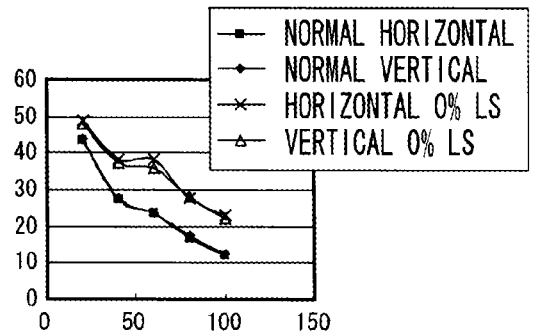
Figure 13E:
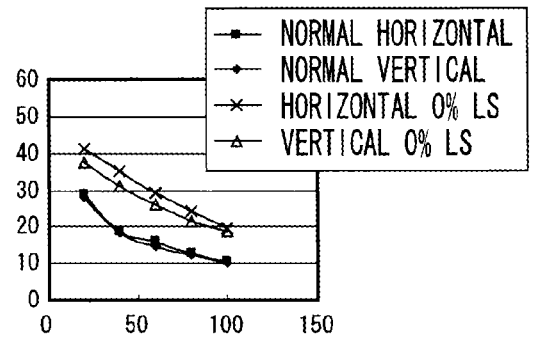
Figure 13C:
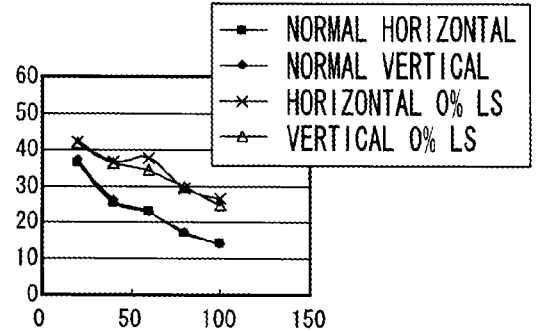
Figure 13F:
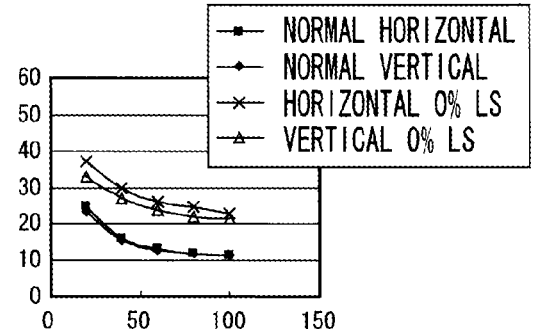
Figure 14A:
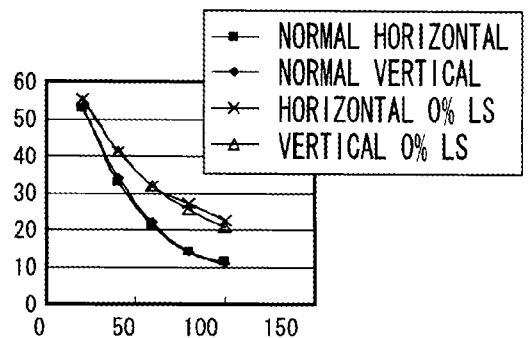
FIGS. 14A to 14F are graphs showing a relationship between a halftone percentage (%) and glossiness (%) in a case of bidirectional printing, when the carriage was moved through the width of a possible movement range.
Figure 14D:
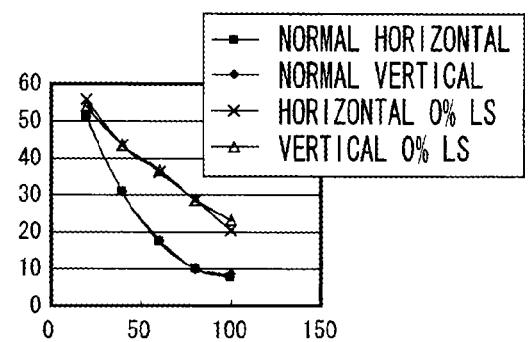
Figure 14B:
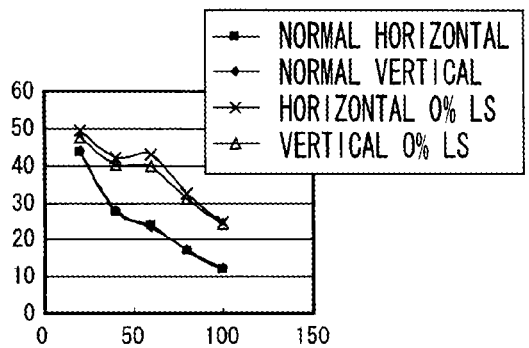
Figure 14E:
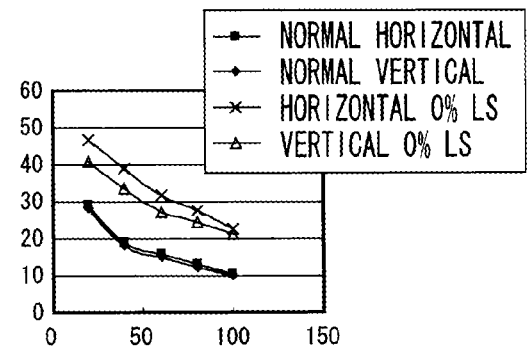
Figure 14C:
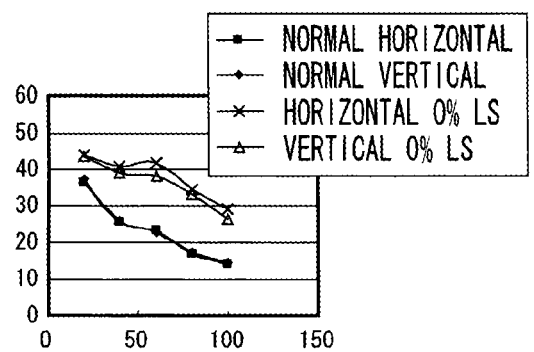
Figure 14F:
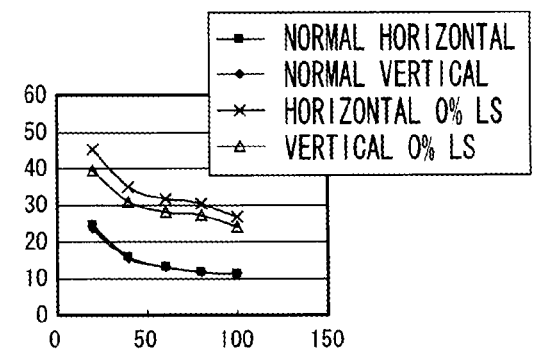

FIGS. 9A and 9B are diagrams of a case where droplet ejection is performed and provisional curing is carried out on the leftmost side of the recording medium 12, when moving the carriage 30 from right to left, in other words, when the time from droplet ejection until provisional curing is shortest. FIG. 9A shows a position of droplet ejection when the carriage 30 is moved from right to left. When the carriage 30 is moved from right to left, similarly to FIG. 8, only the provisional curing light source 32A on the front side of the direction of travel is switched on. FIG. 9B is a diagram showing a position after moving the carriage 30 from right to left. After reaching the position in FIG. 9B, the carriage 30 is moved from left to right, and therefore the provisional curing light source 32A is switched off and the provisional curing light source 32B is switched on. Consequently, the ink droplets ejected at the position shown in FIG. 9A are provisionally cured when the provisional curing light source 32B is switched on, and therefore provisional curing is carried out after moving through the distance between the nozzles and the provisional curing light source (127 mm) Consequently, the time until provisional curing is 127 (mm)/1355 (mm/s) ≈0.09 s, and emission is carried out after approximately 0.1 seconds.

In this way, in FIGS. 9A and 9B, the time from droplet ejection until provisional curing is not considerably different to the prior art, but the ink droplets ejected when the carriage 30 is moved from left to right are provisionally cured when the carriage 30 is moved from right to left and therefore provisional curing is performed after the time illustrated in FIGS. 8A and 8B has elapsed. Consequently, it is possible to form an image having a smooth surface in which the formation of wrinkles is suppressed over the whole image, and therefore the glossiness of the image can be improved.

If image formation is carried out with the recording medium 12 arranged at the left end or the right end of the platen 26, then it may be possible to see a difference in the glossiness of the image due to the effects of the time difference until pinning, between the left and right sides of the formed image. In cases such as these, it is possible to reduce the effects by arranging the recording medium 12 in the center of the platen 26.

Furthermore, in the case of ink, if the logical seek function is switched on for the time interval until emission (if emission is performed when the whole width region of the recording medium 12 has been scanned with the carriage 30), then it is possible to select a case where image formation is carried out by performing a main scanning action through the whole recordable width (1610 mm) of the inkjet recording apparatus 10. In this case, in terms of the movement distance from right to left, the time to the provisional curing light source is the maximum width (1610 mm)+the distance between the nozzle and the provisional curing light source (127 mm)=1737 mm, after droplet ejection, as shown in FIG. 10A. Next, the provisional curing light source 32B on the right side of the carriage 30 is switched on, the provisional curing light source 32A on the left side is switched off, and the carriage 30 is moved from left to right. Provisional curing by the provisional curing light source 32B can be achieved by moving the carriage 30 through the maximum width (1610 mm) (FIG. 10B). Consequently, when image formation has been carried out by performing a scanning action of the carriage 30 shown in FIG. 10 over the maximum possible movement width and by slowing the scanning speed of the carriage, the time to the provisional curing light source is 3347/1270 mm/s≈2.64 s, and hence emission is performed after approximately 2.6 seconds. In an image formed in this way, since a prescribed period of time elapses from droplet ejection until emission of UV light, leveling of the ink progresses and wrinkles are not formed on the surface of the ink, and therefore it is possible to form an image having improved glossiness in the whole of the image.

In FIGS. 8A to 10B, a case of bidirectional printing is shown, but the invention can also be implemented in a case of unidirectional printing in which the carriage is moved from right to left. In this case, similarly to the case of bidirectional printing, the provisional curing light source on the rear side in the direction of travel in the scanning direction is switched off, and only the provisional curing light source on the front side is switched on, whereby provisional curing can be achieved. Furthermore, in the case of unidirectional printing, when the carriage is moved from left to right (return path), droplet ejection is not carried out, and therefore the provisional curing light source on the rear side in the direction of travel in the scanning direction is switched on, and the provisional curing light source on the front side may be switched on, or both the front side and rear side provisional curing light sources may be switched on.

In the present embodiment, by carrying out provisional curing after ejection of color ink droplets and after the prescribed time has elapsed, leveling of the surface of the color ink is achieved, formation of wrinkles on the surface is suppressed, and glossiness is improved.

Consequently, when using white ink or clear ink, if the nozzle rows 61 are divided into two in the conveyance direction of the recording medium, and the nozzle rows 61 of the color inks (M, Lm, C, Lc, Y, K) are used on the upstream side of the conveyance direction of the recording medium and the nozzle rows 61W, 61CL for white ink and clear ink are used on the downstream side of the conveyance direction of the recording medium, then after ejecting droplets of color ink, it is possible to eject droplets of white ink or clear ink during a separate scanning action of the carriage, and the formation of wrinkles on the surface of the color ink can be suppressed. Moreover, if white ink and clear ink are not used, then it is possible to carry out image formation using the whole region of the nozzle row 61 for color ink.

[Comparison with Conventional Apparatus]

(1) Unidirectional Printing

Glossiness was compared after forming an image in two cases: one where both of the provisional curing light sources 32A, 32B arranged on the left and right sides of a conventional carriage 30 were switched on; and one where the provisional curing light source of the rear side in terms of the direction of travel in the scanning direction was switched off, as in the present embodiment. A FujiFilm Acuity LED 1600 wide-format printer (mass-production trial machine) was used for image formation. Furthermore, the glossiness was compared on the basis of the glossiness at an incident angle of 60°, using a BYK Gardner gloss meter Micro-Tri-Gloss μ. The corresponding results are shown in FIGS. 11A to 11F. The graphs shown in FIGS. 11A to 11F plot a value of the 60° gloss value % (vertical axis) against the halftone percentage of the input image (horizontal axis). Furthermore, these results were obtained with unidirectional printing at an image resolution of 600×500. The size of the image was 540 mm in the main scanning direction (Y) by 375 mm in the sub-scanning direction (X), and the experiment was carried out by placing the image in the center of a platen capable of printing through a maximum width of 1610 mm. Solid patches of Y, M, C, R, G, B, 3C, 4C were arranged in the main scanning direction and images having a halftone value of 20%, 40%, 60%, 80% and 100% were formed in the sub-scanning direction.

In a conventional image forming method (normal method), the provisional curing light sources 32A, 32B on the left and the right of the carriage 30 were both set to a light output of 4 mJ/cm$^2$, whereas in the present embodiment, exposure was carried out by switching on only the provisional curing light source on the front side of the direction of travel in the main scanning direction in the outward path (the left side) at a light output of 6 mJ/cm$^2$. Furthermore, when the carriage 30 was scanned on the return path from left to right, droplet ejection was not carried out and the carriage 30 was moved by switching on only the provisional curing light source 32A on the left side. The glossiness of the image was measured in the horizontal direction and the vertical direction. The glossiness was measured respectively for the individual colors of C, M, Y, K, and 3C (CMY) and 4C (CMYK), and in each of these cases, an increase in glossiness was confirmed. In FIGS. 11A to 11F, if the glossiness changes 10%, this change can be clearly distinguished by general visual inspection, and it can be confirmed that the glossiness is improved compared to a case where provisional curing is carried out immediately after droplet ejection as in the prior art.

(2) Bidirectional Printing

Next, the results for bidirectional printing are shown in FIGS. 12A to 14F. An image similar to that of the case of unidirectional printing was created in the center of the platen and the image was evaluated. Similarly to FIG. 11, the graphs shown in FIGS. 12A to 14F plot a value of the 60° gloss value % (vertical axis) against the halftone percentage of the input image (horizontal axis). The image resolution was set to 600×500. FIGS. 12A to 12F shows results of a case where an image was formed by reducing the brightness of the pinning light source on the rear side of the direction of travel of the main scanning direction to 42% with respect to the pinning light source on the front side. As shown in FIGS. 12A to 12F, by reducing the brightness only, no change was observed in the glossiness compared to a conventional apparatus in which the brightness was not changed in the provisional curing light sources 32A, 32B on either side of the carriage 30.

FIGS. 13A to 13F and FIGS. 14A to 14F show results of a case where the provisional curing light source on the rear side in the direction of travel of the scanning direction was switched off; FIGS. 13A to 13F are results in a case where image formation was carried out by moving the carriage 30 reciprocally in the width range of the recording medium 12, and FIGS. 14A to 14F are results in a case where image formation was carried out by moving the carriage 30 reciprocally in the possible movement range of the guide mechanism 28.

As shown in FIGS. 13A to 13F, it can be confirmed that, in bidirectional printing, the glossiness is improved by switching off the provisional curing light source on the rear side in the direction of travel of the scanning direction.

Furthermore, FIGS. 14A to 14F show results where, in order to increase the time from droplet ejection until the first provisional curing action, the logical seek function (a search method for starting on the return path when main scanning has been performed up to the end of the image) was switched off, and exposure was carried out by scanning from end to end of the possible movement range of the guide mechanism 28 (approximately 1600 mm) As shown in FIGS. 14A to 14F, it is confirmed that the glossiness is improved compared to FIGS. 13A to 13F, and hence the glossiness can be further improved by increasing the time from ejection of ink droplets until provisional curing.

Figure 15A:
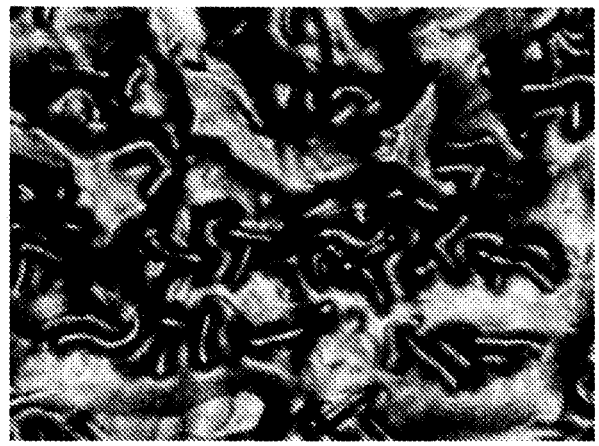
FIGS. 15A and 15B are laser scanning microscope images after image formation.
Figure 15B:

FIGS. 15A and 15B show surface photographs after image formation taken with a laser scanning microscope. FIG. 15A is a surface photograph of an image formed by a conventional method in which the provisional curing light sources on both sides are switched on, and FIG. 15B is a surface photograph of an image formed by switching off the provisional curing light source on the rear side in the direction of travel of the scanning direction. The images were captured by observing the surface with a laser scanning microscope (Keyence VK-9700 shaped laser microscope).

FIG. 15B, which depicts an image formed by an apparatus according to the present embodiment, shows reduced incidence of undulating wrinkles having a width of about 5 to 15 μm, compared to FIG. 15A, and hence it can be confirmed that a smooth surface which readily reflects light is formed. By setting the time interval until pinning on this basis, it is surmised that the polymerization initiator in the ejected ink droplets, the polymerizable monomer, the pigment, and the presence and uneven distribution of polymerization inhibitors in the droplets, are all related to reducing the formation of undulating wrinkles.

Figure 16A:
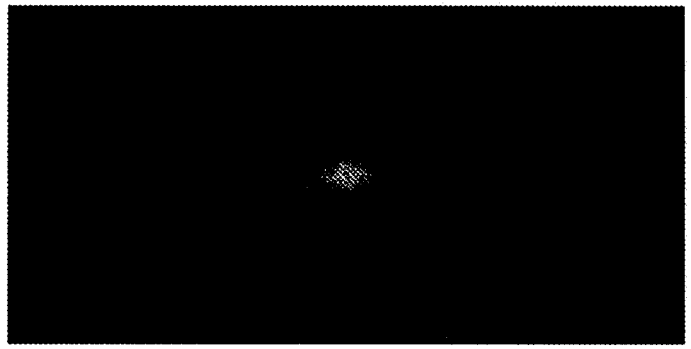
FIGS. 16A and 16B are Fourier transform images of the laser scanning microscope images shown in FIGS. 15A and 15B.
Figure 16B:
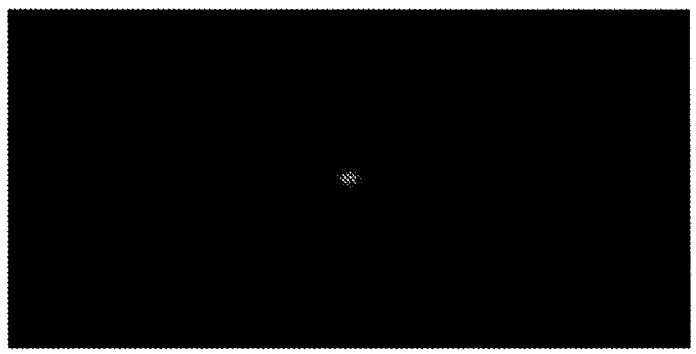

FIG. 16A and FIG. 16B are images showing a Fourier transform of the laser scanning microscope images of FIGS. 15A and 15B. FIG. 16A which is an image corresponding to FIG. 15A formed with the provisional curing light sources on both sides switched on, shows response up to the high-frequency region, and in FIG. 16B which is an image corresponding to FIG. 15B formed by an apparatus according to the present embodiment, it was confirmed that the high-frequency component was suppressed. FIGS. 16A and 16B are Fourier transform images, and therefore the horizontal and vertical axes passing through the center of the image both indicate frequencies, the frequency becoming higher, the further the position from the center.

[Recording Medium]

As described above, various media may be used for the recording medium employed in the inkjet recording apparatus according to the present invention, without any restrictions on the material, such as paper, unwoven cloth, vinyl chloride, compound chemical fibers, polyethylene, polyester, tarpaulin, or the like, or whether the medium is permeable or non-permeable.

More specifically, it is possible to use recording media which are commonly known as a supporting body or a recording material, as a recording medium which can be used in the inkjet recording apparatus (image forming method) relating to the present invention. Possible examples of the recording medium are: paper, paper laminated with plastic (for example, polyethylene, polypropylene, polystyrene, etc.), metal plate (for example, aluminum, zinc, copper, etc.), plastic film (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polvinylacetal, polyvinyl chloride (PVC), acrylic resin, etc.), or paper or plastic film onto which the metal described above has been laminated or vapor deposited (composite aluminum sheet, etc.). Furthermore, it is also suitable to use a non-absorptive recording medium as a recording medium employed in the inkjet recording apparatus relating to the present invention.

(Ink (Ink Composition))

Next, the ink used in the inkjet recording apparatus relating to the present invention (hereinafter, also called "ink composition") will be described in detail.

A possible example of the ink composition is one containing a radically polymerizable compound (component A), a radical polymerization initiator (component B), and a colorant (component C), in which the component A contains a monofunctional radically polymerizable compound (component A-1) and a polyfunctional radically polymerizable compound (component A-2), the component A-1 includes an N-vinyl compound (component A-1-1) and a compound expressed by Formula (I) (component A-1-2), and the content of the component A-1 is 50 to 90 wt % with respect to the total weight of the component A, the content of component A-1-1 is 10 to 40 wt % with respect to the total weight of the component A-1, the content of the component A-1-2 is 5 to 90 wt % with respect to the total weight of the component A-1, the component A-2 contains at least two types of compound represented by Formula (II), and the content of the component A-2 is 0.1 to 25 wt % with respect to the total weight of component A.

[C 3]

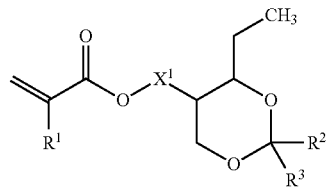

(In Formula (I), $R^1$, $R^2$ and $R^3$ respectively and independently represent a hydrogen atom, a methyl group, or an ethyl group, and $X^1$ represents a single bond or a bivalent linking group.)

[C 4]

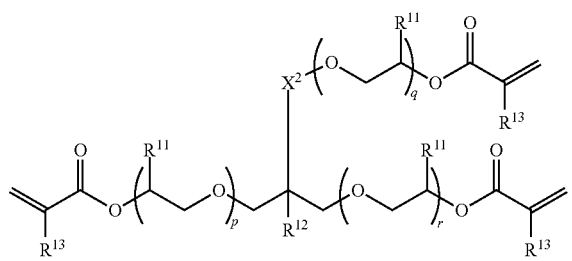

(In Formula (II), $R^{11}$ respectively and independently represents a hydrogen atom or an alkyl group having 1 to 6 carbon atoms which may be substituted, $R^{12}$ represents a hydrogen atom or an alkyl group having 1 to 6 carbon atoms which may be substituted, $R^{13}$ respectively and independently represents a hydrogen atom or a methyl group, $X^2$ represents a single bond or a bivalent linking group, and p, q and r respectively and independently represent an integer from 0 to 5.)

Furthermore, the ink composition may also be one containing a radically polymerizable compound (component A), a radical polymerization initiator (component B), and a colorant (component C), in which the component A contains a monofunctional radically polymerizable compound (component A-1) and a polyfunctional radically polymerizable compound (component A-2), the component A-1 includes an N-vinyl compound (component A-1-1) and a compound expressed by Formula (I) (component A-1-2), and the content of the component A-1 is 50 to 90 wt % with respect to the total weight of the component A, the content of the component A-1-1 is 10 to 40 wt % with respect to the total weight of the component A-1, the content of component A-1-2 is 5 to 90 wt % with respect to the total weight of component A-1, the component A-2 contains at least one type of compound represented by Formula (II'), and the content of the component A-2 is 0.1 to 25 wt % with respect to the total weight of component A.

[C 5]

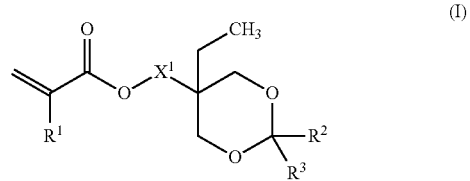

(In Formula (1), $R^1$, $R^2$ and $R^3$ respectively and independently represent a hydrogen atom, a methyl group, or an ethyl group, and $X^1$ represents a single bond or a bivalent linking group.)

[C 6]

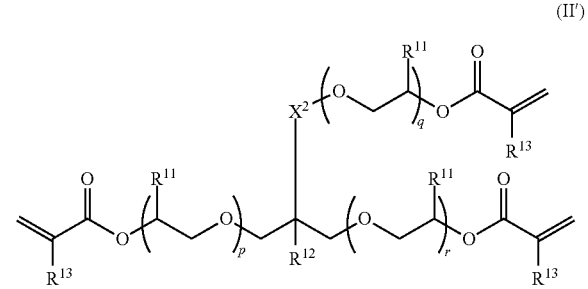

(In Formula (II'), $R^{11}$ represents a hydrogen atom or an alkyl group having 1 to 6 carbon atoms which may be substituted, $R^{12}$ represents a hydrogen atom or an alkyl group having 1 to 6 carbon atoms which may be substituted, $R^{13}$ respectively and independently represents a hydrogen atom or a methyl group, $X^2$ represents a single bond or a bivalent linking group, and p, q and r respectively and independently represent an integer from 0 to 5, and satisfy the relationship $p+q+r \geq 1$.)

In the present invention, "(meth)acrylic" means any one, or both, of "acrylic" and "methacrylic", and "(meth)acrylate" means any one, or both, of "acrylate" and "methacrylate".

The ink composition used in the present invention is an oily ink composition which can be cured by an active radiation beam (also called active energy beam). The "active radiation beam" is a radiation beam which can apply energy to generate an initiating species in the ink composition when the beam is emitted, and includes an a beam, a γ ray, X ray, ultraviolet light beam, visible light beam, electron beam, and the like. Of these, an ultraviolet light beam and an electron beam are desirable from the viewpoint of curing sensitivity and ease of procurement of the related apparatus, and an ultraviolet light beam is most desirable.

Desirably, the ink composition used in the present invention includes N-vinyl caprolactam as the component A-1-1, cyclic trimethylol propane formal acrylate as the component A-1-2, at least two trifunctional ethylenically unsaturated compounds represented by Formula (II) as the component A-2, and a monoacyl phosphine oxide compound and/or a bis-acyl phosphine oxide compound and a thioxanthone compound, as the component B.

Furthermore, the ink component used in the present invention includes N-vinyl caprolactam as the component A-1-1, cyclic trimethylol propane formal acrylate as the component A-1-2, at least one trifunctional ethylenically unsaturated compounds represented by Formula (II') as the component A-2, and a monoacyl phosphine oxide compound and/or a bis-acyl phosphine oxide compound and a thioxanthone compound, as the component B.

The ink composition used in the present invention includes the compounds in the component A-1 and the component A-2 described below, as component A, the content of the component A-1 is 50 to 90 wt % with respect to the total weight of the component A, the content of the component A-1-1 is 10 to 40 wt % with respect to the total weight of the component A-1, the content of the component A-1-2 is 5 to 90 wt % with respect to the total weight of the component A-1, and the content of the component A-2 is 0.1 to 25 wt % with respect to the total weight of the component A.

The components A-1 and A-2 are described below.
(Component A-1) Monofunctional Radically Polymerizable Compound The ink component used in the present invention includes the monofunctional radically polymerizable compound (component A-1).

For the component A-1, it is desirable to use a radically polymerizable compound having one ethylenically unsaturated group. Of these, an N-vinyl compound (component A-1-1) and a compound represented by Formula (I) (component A-1-2) are more desirable.

More desirably, the ink composition used in the present invention contains an N-vinyl compound (component A-1-1) and a compound represented by Formula (I) (component A-1-2) as the component A-1.

The component A-1-1 and the component A-1-2 are described below.

The ink composition used in the present invention contains an N-vinyl compound (component A-1-1).

The component A-1-1 is described below.

It is desirable to contain an N-vinyl lactam or an N-vinyl formaldehyde as the component A-1-1. Furthermore, desirably, the N-vinyl lactam is a compound represented by Formula (a).
<N-Vinyl Lactam>

The ink composition used in the present invention desirably contains a compound represented by Formula (a), as the component A-1-1.

[C 7]

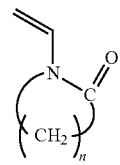

(a)

In Formula (a), n represents an integer of 2 to 6, and from the viewpoint of the flexibility after the curing of the ink composition, the adhesion with the recording medium and the ease of procurement of the starting material, n is desirably an integer of 3 to 5, n is more desirably 3 or 5, and n is most desirably 5, in other words, N-vinyl caprolactam. N-vinyl caprolactam is desirable since it has excellent safety properties, can be procured widely and relatively inexpensively, and yields especially good ink curing properties and good adhesion of the cured film to the recording medium.

Furthermore, in the N-vinyl lactam described above, the hydrogen atom in the lactam ring may be substituted with a substitute group, such as an alkyl group, an aryl group, or the like, and the lactam ring and the saturated or unsaturated ring structure may be linked.

It is possible to use just one type, or to combine two or more types, of the compound represented by Formula (a).
<N-Vinyl Formaldehyde>

A compound having the structure described below is desirable as the N-vinyl formaldehyde. The compound having the structure given below can be acquired as a commercial product: Arakawa Chemical Industries Co., Ltd. Beam Set 770.

[C 8]

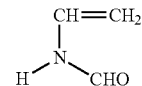

<Compound Represented by Formula (I)>

The ink composition used in the present invention desirably contains a compound represented by Formula (I), as the component A-1-2.

Below, the compound represented by Formula (I) which is used as the component A-1-2 of the ink composition used in the present invention will be described.

[C 9]

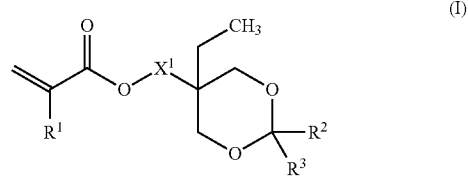

(I)

(In Formula (I), $R^1$, $R^2$ and $R^3$ respectively and independently represent a hydrogen atom, a methyl group, or an ethyl group, and $X^1$ represents a single bond or a bivalent linking group.)

$R^1$ is desirably a hydrogen atom or a methyl group, and more desirably, a hydrogen atom.

Desirably, $R^2$ and $R^3$ are respectively and independently a hydrogen atom or a methyl group, and $R^2$ and $R^3$ are more desirably both hydrogen atoms.

The bivalent linking group in $X^1$ is not limited in particular, provided that it does not significantly impair the beneficial effects of the present invention, but is desirably a bivalent hydrocarbon group or a bivalent group which combines a hydrocarbon group and an ether bond, and more desirably a bivalent hydrocarbon group, a poly(alkylene oxy) group or a poly(alkylene oxy) alkylene group. Furthermore, the number of carbon atoms in the bivalent linking group is desirably 1 to 60, and more desirably 1 to 20.

$X^1$ is desirably a single bond, a bivalent hydrocarbon group, or a bivalent group which combines a hydrocarbon group and an ether bond, more desirably, a bivalent hydrocarbon group having 1 to 20 carbon atoms, even more desirably, a bivalent hydrocarbon group having 1 to 8 carbon atoms, and most desirably, a methylene group.

Concrete examples of component A-1-2 are given below, but the component A-1-2 is not limited to these compounds. In the concrete examples described below, R represents a hydrogen atom or a methyl group.

[C 10]

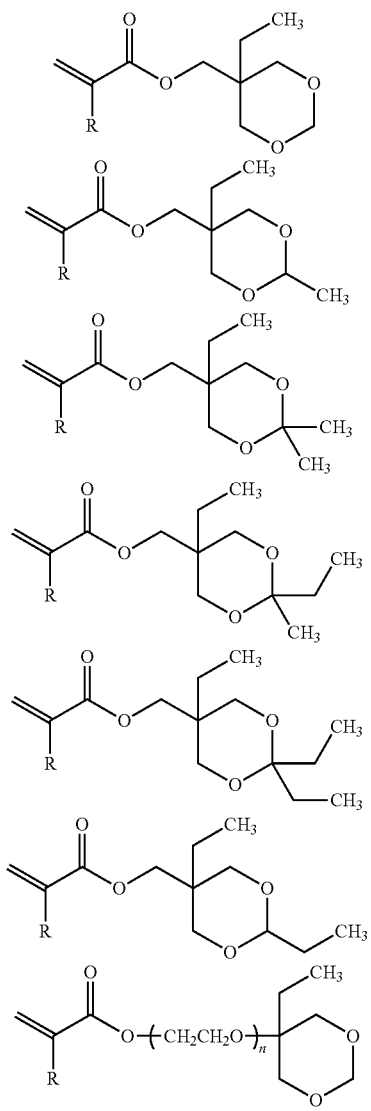

n = 1~30

Of these, cyclic trimethylol propane formal(meth)acrylate is desirable, and cyclic trimethylol propane formal acrylate (CTFA) is especially desirable.

The component A-1-2 may be a commercial product and a desirable concrete example of a commercial product is SR531 (made by Sartomer).

The content of the component A-1 in the ink composition used in the present invention is 50 to 90 wt %, desirably, 50 to 80 wt %, and more desirably, 60 to 80 wt %, with respect to the total weight of the component A.

If the content of the component A-1 is less than 50 wt % or exceeds 90 wt %, a desired ejection stability and a desired adhesion of the obtained curing film to the base material are not obtained.

By containing the component A-1 in the range described above, an ink component having excellent ejection stability and excellent adhesion of the obtained cured film to the base material is obtained.

Furthermore, the content of the component A-1-1 in the ink composition used in the present invention is 10 to 40 wt %, and desirably 15 to 30 wt %, with respect to the total weight of the component A-1.

Moreover, the content of the component A-1-2 in the ink composition used in the present invention is 5 to 90 wt %, and desirably 30 to 90 wt %, with respect to the total weight of the component A-1.

(Component A-2) Polyfunctional Radically Polymerizable Compound

The ink composition used in the present invention contains a polyfunctional radically polymerizable compound (component A-2).

For the component A-2, it is desirable to use a radically polymerizable compound having no less than two ethylenically unsaturated groups. Furthermore, a compound represented by Formula (II) is contained as the component A-2.

<Compound Represented by Formula (II)>

The ink composition according to the first embodiment of the present invention contains at least two compounds represented by Formula (II), as component A-2.

Below, the compound represented by Formula (II) which is used as the component A-2 of the ink composition used in the present invention will be described.

[C 11]

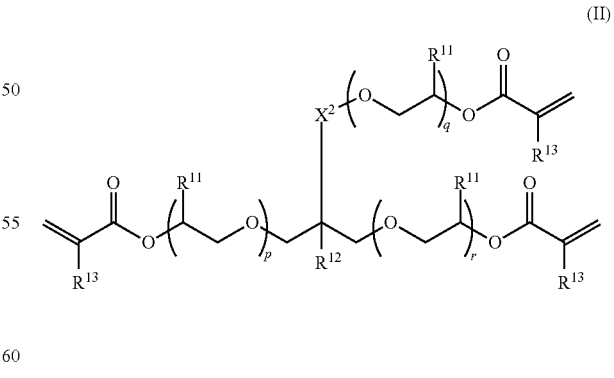

(II)

(In Formula (II), $R^{11}$ respectively and independently represents a hydrogen atom or an alkyl group having 1 to 6 carbon atoms which may be substituted, $R^{12}$ represents a hydrogen atom or an alkyl group having 1 to 6 carbon atoms which may be substituted, $R^{13}$ respectively and independently represents a hydrogen atom or a methyl group, $X^2$ represents a single bond or a bivalent linking group, and p, q and r respectively and independently represent an integer from 0 to 5).

In Formula (II), $R^{11}$ represents an hydrogen atom or an alkyl group having 1 to 6 carbon atoms, which may be substituted, and the alkyl group may be a straight chain or a branched group. Examples of possible substitute groups are: a halogen atom, a hydroxy group and an amino group. Desirably, $R^{11}$ is a hydrogen atom, a methyl group, an ethyl group or a propyl group, and especially desirably, a hydrogen atom or a methyl group.

In Formula (II), $R^{12}$ represents an hydrogen atom or an alkyl group having 1 to 6 carbon atoms, which may be substituted, and the alkyl group may be a straight chain or a branched group. Examples of possible substitute groups are: a halogen atom, a hydrogen group and an amino group. Desirably, $R^{12}$ is a hydrogen atom, a methyl group, an ethyl group, a propyl group, a methylol group, an ethylol group, and especially desirably, is a hydrogen atom, a methyl group, an ethyl group or a methylol group.

$R^{13}$ respectively and independently represents a hydrogen atom or a methyl group, and desirably is a hydrogen atom.

In Formula (II), $X^2$ represents a single bond or a bivalent linking group, and although there are no particular restrictions on the bivalent linking group, provided that it does not significantly impart the beneficial effects of the present invention, it is desirably a bivalent hydrocarbon group or a bivalent linking group which combines a hydrocarbon group and an ether bond.

Desirably, $X^2$ may be single bond, a bivalent hydrocarbon group having 1 to 6 carbon atoms, or an oxyalkylene group having 1 to 6 carbon atoms, and especially desirably, is a single bond or a methylene group.

In Formula (II), p, q and r respectively and independently represent an integer of 0 to 5. p, q and r are respectively and independently 0 to 3, desirably, and 0 to 2, especially desirably. Furthermore, the desirable combination of p, q and r values is, for instance, p=q=r=0, p=q=r=1 or p=q=r=2, and so on.

Concrete examples of a compound in a case where p, q and r have desirable values are described below, but are not limited to these values.

Desirable modes of a compound according to Formula (II) in a case where p=q=r=0 are: trimethylol propane triacrylate (where $R^{12}$ is an ethyl group, $R^{13}$ is a methyl group, and $X^2$ is a methylene group), trimethylol propane trimethacrylate (where $R^{12}$ is an ethyl group, $R^{13}$ is a methyl group, and $X^2$ is a methylene group), trimethylol ethane triacrylate (where $R^{12}$ is a methyl group, $R^{13}$ is a hydrogen atom, and $X^2$ is methylene), trimethylol ethane trimethacrylate (where $R^{12}$ is a methyl group, $R^{13}$ is a methyl group, and $X^2$ is methylene), tetramethylol methane triacrylate (where $R^{12}$ is a methylol group, $R^{13}$ is a hydrogen atom, and $X^2$ is a methylene group), tetramethylol methane trimethacrylate (where $R^{12}$ is an methylol group, $R^{13}$ is a methyl group, and $X^2$ is a methylene group), glycerine triacrylate (where $R^{12}$ is a hydrogen atom, $R^{13}$ is a hydrogen atom, and $X^2$ is a methylene group), and glycerine trimethacrylate (where $R^{12}$ is a hydrogen atom, $R^{13}$ is a methyl group, and $X^2$ is a methylene group).

These materials can be procured as commercial products, such as SR351S, SR444, SR350, and the like, from Sartomer.

A desirable mode of a compound according to Formula (II) is a case where p=q=r=1 is a compound having the structural formula shown below. These compounds can be procured as a commercial product, such as SR454, SR9020, SR492 from Sartomer, or denacol acrylate DA-314 (made by Nagase Chemtex Cor.), and so on.

[C 12]

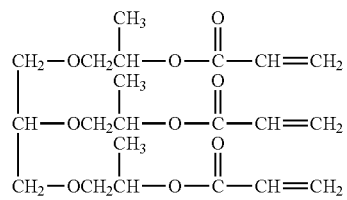
(II-a)

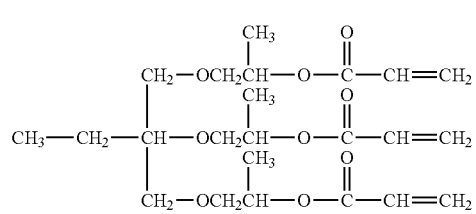
(II-b)

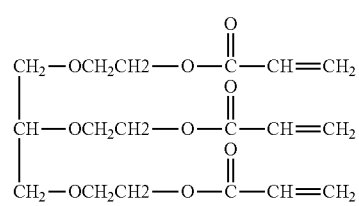
(II-c)

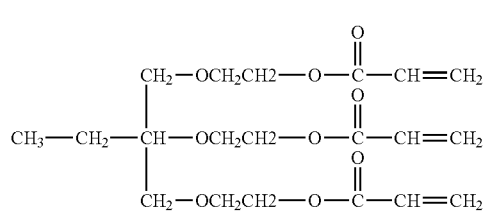
(II-d)

A desirable mode of a compound according to Formula (II) in a case where p, q and r have other values is a compound having the structural formula shown below. These compounds can be procured as commercial products, such as SR9021, SR9035, SR415 from Sartomer, Aronix M-320 from Toa Gosei Co., Ltd., NK ester A-GLy-9E from Shin Nakamura Chemical Co., Ltd., and the like.

[C 13]

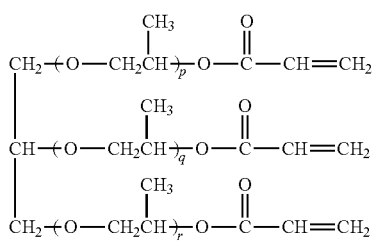
(II-e)

(Mixture of p + q + r = 5.6)

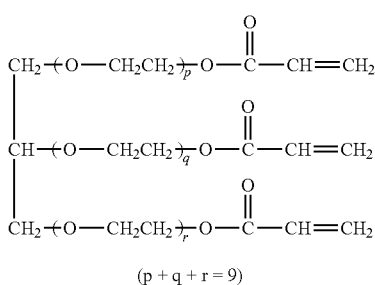

(p + q + r = 9)

The compound represented by Formula (II) desirably uses a combination of a plurality of two or more types of compound. A desirable mode in this case is one which uses a mixture of (II-a) and (II-d), or a mixture of trimethylol propane triacrylate and (II-d), and a mixture of trimethylol propane triacrylate and (II-d) is especially desirable. Desirably, at least one compound is trimethylol propane triacrylate, and desirably, the content of this compound is 0.5 to 8 wt % with respect to the total weight of the component A.

The content of the component A-2 in the ink composition used in the present invention is 0.1 to 25 wt %, desirably, 0.5 to 10 wt %, and more desirably, 2 to 9 wt %, with respect to the total weight of the component A.

If the content of A-2 is in the range stated above, then it is possible to obtain an ink composition having excellent curing properties and ejection stability, and excellent glossiness and adhesion of the obtained cured film to the base material.

<Compound Represented by Formula (II')>

The ink component according to the second embodiment of the present invention contains at least one compound represented by Formula (II'), as component A-2.

Below, the compound represented by Formula (II') which is used as the component A-2 of the ink composition used in the present invention will be described.

[C 14]

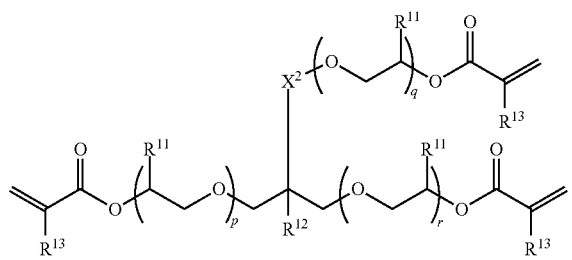

(In Formula (II'), $R^{11}$ represents a hydrogen atom or an alkyl group having 1 to 6 carbon atoms which may be substituted, $R^{12}$ represents a hydrogen atom or an alkyl group having 1 to 6 carbon atoms which may be substituted, $R^{13}$ respectively and independently represents a hydrogen atom or a methyl group, $X^2$ represents a single bond or a bivalent linking group, and p, q and r respectively and independently represent an integer from 0 to 5, and satisfy the relationship $p+q+r \geq 1$.)

In Formula (II'), $R^{11}$, $R^{12}$, $R^{13}$ and $X^2$ have the same definition as $R^{11}$, $R^{12}$, $R^{13}$ and $X^2$ in Formula (II) and the desirable modes are similar. p, q and r respectively and independently represent an integer of 0 to 5 and satisfy the relationship $p+q+r \geq 1$. p, q and r are respectively and independently 1 to 3, desirably, and 1 or 2, especially desirably.

Concrete examples of the compound when p, q and r have desirable values are (II-a), (II-b), (II-c), etc. among the compounds given as desirable modes of the compound represented by Formula (II), but are not limited to these.

(Component A-1-3) (Meth)acrylate Compound Having Aromatic Hydrocarbon Ring

The ink composition used in the present invention can also desirably include a (meth)acrylate compound which has an aromatic hydrocarbon ring (component A-1-3) as component A-1.

The component A-1-3 is described below.

A desirable example of the component A-1-3 is the aromatic monofunctional radically polymerizable monomer described in paragraphs 0048 to 0063 of Japanese Patent Application Publication No. 2009-96985. In the present invention, a compound represented by Formula (a-2) is desirable as the monofunctional (meth)acrylate compound having an aromatic hydrocarbon ring.

[C 15]

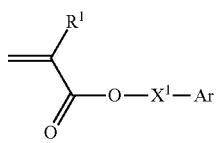

(In Formula (a-2), $R^1$ represents a hydrogen atom or a methyl group, $X^1$ represents a bivalent linking group, and Ar represents a monovalent aromatic hydrocarbon group.)

In Formula (a-2), $R^1$ is desirably a hydrogen atom.

$X^1$ represents a bivalent linking group, which is an ether bond (—O—), an ester bond (—C(O)O— or —OC(O)—), an amide bond (—C(O)NR'— or NR'C(O)—), a carbonyl group (—C(O)—), an imino group (—NR'—), an alkylene group having 1 to 15 carbon atoms which may contain a substitute group, or a bivalent group which combines two or more of the foregoing groups. R' represents a hydrogen atom, a straight chain, branched or cyclic alkyl group having 1 to 20 carbon atoms, or an aryl group having 6 to 20 carbon atoms. Examples of possible substitute groups are a hydroxyl group and a halogen atom.

The portion including $R^1$ and $X^1$ ($H_2C$=$C(R^1)$—$C(O)O$—$X^1$—) can be bonded at any desired position on the aromatic hydrocarbon ring. Furthermore, from the viewpoint of improving affinity with the colorant, desirably, the end which bonds with the aromatic hydrocarbon ring in X1 is an oxygen atom, and more desirably, an etheric oxygen atom. $X^1$ in Formula (a-2) is desirably *-(LO)q-. Here, * indicates a bonding position of the carboxylic acid ester bond in Formula (a-2), q is an integer of 0 to 10, and L represents an alkylene group having 2 to 4 carbon atoms. Desirably, q is an integer of 0 to 4, more desirably, an integer of 0 to 2, and even more desirably, 1 or 2. (LO)q is desirably an ethylene oxide chain or a propylene oxide chain.

Ar represents a monovalent aromatic hydrocarbon group.

Possible examples of the monovalent aromatic hydrocarbon group are a monovalent monocyclic or polycyclic aromatic hydrocarbon group having one to four rings, of which specific examples are: benzene, naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthtrylene, aceanthtrylene, chrysene, and the like, from which one hydrogen atom has been removed.

Of these, in the present invention, desirably, the monovalent aromatic hydrocarbon group is a phenyl group or a naphthyl group, and more desirably, a monocyclic aromatic hydrocarbon group, in other words, a phenyl group.

The monovalent aromatic hydrocarbon group may include a substitute group on the aromatic ring.

Desirably, the substitute group described above is a halogen atom, an alkyl group, an alkenyl group, a carboxyl group, an acyl group having 1 to 10 carbon atoms, a hydroxy group, a substituted or non-substituted amino group, a thiol group, a siloxane group, or a hydrocarbon group or complex ring group having a total of no more than 30 carbon atoms, which may include substitute groups.

The substitute group may also include a substitute group, for example, a hydroxyl group, an alkyl group having 1 to 10 carbon atoms, or an aryl group having 6 to 12 carbon atoms.

If the monovalent aromatic hydrocarbon group has a plurality of substitute groups, then the substitute groups may be the same or may be different. Furthermore, the substitute groups may be bonded and may form a 5 or 6-part ring.

Furthermore, desirably, the monovalent aromatic hydrocarbon group may include a substitute group on the aromatic ring.

In the present invention, desirably, the compound represented by Formula (a-2) is a compound having a phenyl group, more desirably, it is 2-phenoxy ethyl(meth)acrylate or benzyl(meth)acrylate, and even more desirably, it is 2-phenoxy ethyl(meth)acrylate, and especially desirably, 2-phenoxy ethyl acrylate (PEA).

Furthermore, the content of the component A-1-3 in the ink composition used in the present invention is 5 to 40 wt %, and desirably 8 to 30 wt %, with respect to the total weight of the component A-1.

If the content of A-1-3 is in the range stated above, then it is possible to obtain an ink composition having an excellent curing properties and ejection stability, and excellent glossiness and adhesion of the obtained cured film to the base material.

<Further Polymerizable Compounds>

The ink composition used in the present invention may also contain further polymerizable compounds, other than the component A-1-1, the component A-1-2, the component A-1-3 and the compound represented by Formula (II) in the components A-1 and A-2.

There are no particular restrictions on the further polymerizable compound, but an ethylenically unsaturated compound is desirable.

For the further polymerizable compound, it is possible to use the commonly known polymerizable compound, of which examples are a (meth)acrylate compound, a vinyl ether compound, an aryl compound, an unsaturated carboxylic acid, or the like, apart from the component A-1-1, the component A-1-2, the component A-1-3, and the compound represented by Formula (II). Specific examples are: a radically polymerizable monomer described in Japanese Patent Application Publication No. 2009-221414, a polymerizable compound described in Japanese Patent Application Publication No. 2009-209289, and an ethylenically unsaturated compound described in Japanese Patent Application Publication No. 2009-191183.

The ink composition used in the present invention can also desirably use a bifunctional (meth)acrylate compound other than the component A-1-1, component A-1-2, component A-1-3 and a compound represented by Formula (II). The bifunctional (meth)acrylate compound is desirably a bifunctional (meth)acrylate compound having a hydrocarbon chain which may include a branch having 5 or more carbon atoms.

A desirable example of a bifunctional (meth)acrylate compound is a bifunctional (meth)acrylate compound having a hydrocarbon chain with 5 or more carbon atoms in the molecule, more specifically: neopentyl glycol di(meth)acrylate, propylene oxide (PO)-modified neopentyl glycol di(meth)acrylate, hexane diol di(meth)acrylate, PO-modified hexane diol di(meth)acrylate, nonane diol di(meth)acrylate, decane diol di(meth)acrylate, dodecane diol di(meth)acrylate, tridecane diol di(meth)acrylate, octadecane diol di(meth)acrylate, 3-methyl-1,5-pentane diol di(meth)acrylate, 2-n-butyl-2-ethyl-1,3-propane diol di(meth)acrylate, cyclohexane dimethanol di(meth)acrylate, and cyclohexane di(meth)acrylate, and the like. Of these, PO-modified neopentyl glycol di(meth)acrylate is especially desirable.

The ink composition used in the present invention can also use a trifunctional or higher-functional (meth)acrylate compound as the polymerizable compound other than the component A-1-1, component A-1-2, component A-1-3 and the compound represented by Formula (II). Desirable examples of a quadrifunctional (meth)acrylate compound are pentaerythritol tetra(meth)acrylate, dipentaerythritol tetra(meth)acrylate, dipentaerythritol hexa(meth)acrylate, and so on.

Possible example of a further polyfunctional (meth)acrylate are: bis(4-(meth)acryloxy polyethoxy phenyl)propane, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol diacrylate, 2,2-bis(4-(meth)acryloxy polyethoxy phenyl) propane, and the like.

Furthermore, examples of a further polymerizable compound are: unsaturated carboxylic acids, such as acrylic acid, methacrylic acid, itaconic acid, crotonic acid, isocrotonic acid, maleic acid, or the like, and salts of these, an anhydride having an ethylenically unsaturated group, acrylonitrile, styrene, or a radically polymerizable compound, such as various unsaturated polyesters, unsaturated polyethers, unsaturated polyamides, unsaturated urethanes, and the like.

More specifically, the further polymerizable compound is a (meth)acrylic acid derivative, such as: 2-ethyl hexyl(meth)acrylate, 2-hydroxy ethyl(meth)acrylate, butoxy ethyl(meth)acrylate, carbitol(meth)acrylate, cyclohexyl(meth)acrylate, benzyl(meth)acrylate, methyl(meth)acrylate, n-butyl(meth)acrylate, allyl(meth)acrylate, glycidyl(meth)acrylate, dimethyl amino methyl(meth)acrylate, oligoester(meth)acrylate, N-methylol(meth)acrylamide, diacetone(meth)acrylamide, epoxy(meth)acrylate, or the like, and a derivative of an allyl compound, such as allyl glycidyl ether, diallyl phthalate, triallyl trimellitate, and the like.

More specifically, it is possible to use radically polymerizable or cross-linkable monomers, oligomers and polymers which are commercial products or commonly known in the field, as described, for example, in "Cross-linking agent handbook", S. Yamashita, ed., (Taiseisha, 1981), "UV/EB curing handbook (starting materials etc.)", K. Kato, ed., (Kobunshi Kankokai, 1985), "UV/EB curing technology: Applications and market", Radtech Research Institute, ed., p.79 (CMC Books, 1989), "Polyester resin handbook", E. Takiyama (Nikkan Kogyo Shinbunsha, 1988), and so on.

Desirably, the molecular weight of the further polymerizable compound is 80 to 2,000, more desirably, 80 to 1,000, and even more desirably, 80 to 800.

The ink composition used in the present invention can also desirably use a monofunctional vinyl ether compound as a further polymerizable compound other than the component A-1-1, component A-1-2, component A-1-3 and the compound represented by Formula (II).

Examples of a desirably used monofunctional vinyl ether compound include: for example, ethylene glycol monovinyl ether, triethylene glycol monovinyl ether, hydroxyl ethyl monovinyl ether, ethyl vinyl ether, n-butyl vinyl ether, isobutyl vinyl ether, octadecyl vinyl ether, cyclohexyl vinyl ether, hydroxyl butyl vinyl ether, 2-ethyl hexyl vinyl ether, hydroxyl nonyl monovinyl ether, cyclohexane dimethanol monovinyl ether, n-propyl vinyl ether, isopropyl vinyl ether, dodecyl vinyl ether, diethylene glycol monovinyl ether, and the like.

Furthermore, it is also possible to use a polyfunctional vinyl ether compound. Examples of a desirably used polyfunctional vinyl ether compound include di- or trivinyl ether compounds, such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, trimethylol propane trivinyl ether, or the like.

If the ink composition used in the present invention contains a polymerizable compound other than the component A-1-1, the component A-1-2, the component A-1-3 and the compound represented by Formula (II) in the components A-1 and A-2, then the content of this further polymerizable compound is desirably 1 to 50 wt % with respect to the total weight of the polymerizable compound, more desirably, 2 to 40 wt %, and especially desirably, 2 to 30 wt %.

(Component B) Radical Polymerization Initiator

The ink composition used in the present invention includes a radical polymerization initiator (component B). The ink composition which has been ejected onto the supporting body is cured by irradiation with an active radiation beam. This generates a polymerization initiating species, such as radicals, by decomposing the radical polymerization initiator contained in the ink composition used in the present invention, by the irradiation with the active radiation beam, and a polymerization reaction of the polymerizable compound is started and promoted by the function of this initiating species.

The radical polymerization initiator in the present invention is not limited to a compound which generates a polymerization initiating species by absorbing external energy, such as an active radiation beam, and also includes a compound (a so-called "sensitizing agent") which promotes decomposition of the polymerization initiator by absorbing a particular active energy beam. In the ink composition used in the present invention, if a sensitizing agent is present as well as a radical polymerization initiator, the sensitizing agent in the system assumes an excited state upon absorbing the active radiation beam, and promotes the decomposition of the radical polymerization initiator by coming into contact with the radical polymerization initiator, thereby making it possible to achieve a curing reaction of higher sensitivity. Possible examples of a sensitizing agent are described, for example, in Japanese Patent Application Publication No. 2008-208190.

The ink composition used in the present invention desirably contains, as the component B, a monoacyl phosphine oxide compound (component B-1) and/or a bis-acyl phosphine oxide compound (component B-2), and a thioxanthone compound (component B-3).

By combining the component B with the components A-1, A-2 and the component C, it is possible to obtain an ink composition having excellent curing properties and ejection stability, and excellent glossiness and adhesion of the obtained cured film to the base material.

The components B-1 to B-3 are described below.

(Component B-1) Monoacyl Phosphine Oxide Compound

There are no particular restrictions on the monoacyl phosphine oxide compound (component B-1), and although it is possible to use a commonly known compound, a compound represented by Formula (b-1) below is desirable.

[C 16]

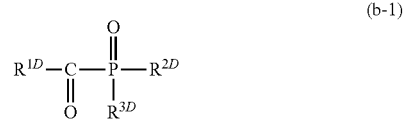

(b-1)

(In Formula (b-1), $R^{1D}$, $R^{2D}$, $R^{3D}$ respectively and independently represent an aromatic hydrocarbon group which may have a methyl group or ethyl group as a substitute group.)

In the monoacyl phosphine oxide compound represented by Formula (b-1), desirably, $R^{1D}$ to $R^{3D}$ are respectively and independently a phenyl group which may have a methyl group as a substitute group, and more desirably, $R^{2D}$ and $R^{3D}$ are a phenyl group, and $R^{1D}$ is a phenyl group having 1 to 3 methyl groups.

Of these, 2,4,6-trimethyl benzoyl diphenyl phosphine oxide (Darocur TPO made by Ciba Japan, or Lucirin TPO made by BASF) is desirable as the monoacyl phosphine oxide compound represented by Formula (b-1).

The content of component B-1 is desirably 0.1 to 3 wt %, and more desirably, 0.5 to 3 wt % with respect to the whole of the ink composition.

(Component B-2) Bis-Acyl Phosphine Oxide Compound

There are no particular restrictions on the bis-acyl phosphine oxide compound (component B-2), and although it is possible to use a commonly known compound, a compound represented by Formula (b-2) below is desirable.

[C 17]

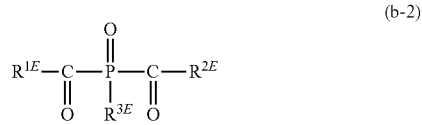

(b-2)

(In Formula (b-2), $R^{1E}$, $R^{2E}$, $R^{3E}$ respectively and independently represent an aromatic hydrocarbon group which may have a methyl group or ethyl group as a substitute group.)

It is possible to use a commonly known compound as the bis-acyl phosphine oxide compound. Possible examples thereof are: bis-acyl phosphine oxide compounds described in Japanese Patent Application Publication No. 3-101686, Japanese Patent Application Publication No. 5-345790, and Japanese Patent Application Publication No. 6-298818.

Specific examples are: bis(2,6-dichlorobenzoyl)phenyl phosphine oxide, bis(2,6-dichlorobenzoyl)-2,5-dimethyl phenyl phosphine oxide, bis(2,6-dichlorobenzoyl)-4-ethoxy phenyl phosphine oxide, bis(2,6-dichlorobenzoyl)-4-propyl phenyl phosphine oxide, bis(2,6-dichlorobenzoyl)-2-naphthyl phosphine oxide, bis(2,6-dichlorobenzoyl)-1-naphthyl phosphine oxide, bis(2,6-dichlorobenzoyl)-4-chloro phenyl phosphine oxide, bis(2,6-dichlorobenzoyl)-2,4-dimethoxy phenyl phosphine oxide, bis(2,6-dichlorobenzoyl) decyl phosphine oxide, bis(2,6-dichlorobenzoyl)-4-octyl phenyl phosphine oxide, bis(2,4,6-trimethyl benzoyl) phenyl phosphine oxide, bis(2,4,6-trimethyl benzoyl)-2,5-dimethyl phenyl phosphine oxide, bis(2,6-dichloro-3, 4, 5-trimethoxy benzoyl)-2,5-dimethyl phenyl phosphine oxide, bis(2,6-dichloro-3, 4, 5-trimethoxy benzoyl)-4-ethoxy phenyl phosphine oxide, bis(2-methyl-l-naphthoyl)-2,5-dimethyl phenyl phosphine oxide, bis(2-methyl-1-naphthoyl)-4-ethoxy phenyl phosphine oxide, bis(2-methyl-l-naphthoyl)-2-naphthyl phosphine oxide, bis(2-methyl-l-naphthoyl)-4-propyl phenyl phosphine oxide, bis(2-methyl-l-naphthoyl)-2, 5-dimethyl phenyl phosphine oxide, bis(2-methoxy-l-naphthoyl)-4-ethoxy phenyl phosphine oxide, bis(2-chloro-l-naphthoyl)-2,5-dimethyl phenyl phosphine oxide, bis(2,6-dimethoxy benzoyl)-2,4,4-trimethyl pentyl phosphine oxide, and the like.

Of these, the bis-acyl phosphine oxide compound is desirably a bis(2,4,6-trimethyl benzoyl)phenyl phosphine oxide (IRGACURE 819: made by BASF Japan), or a bis(2,6-dimethoxy benzoyl)-2,4,4-trimethyl pentyl phosphine oxide, or the like.

The content of component B-2 is desirably 0.5 to 10 wt %, and more desirably, 1 to 5 wt % with respect to the whole of the ink composition.

(Component B-3) Thioxanthone Compound

The ink composition used in the present invention can desirably include a thioxanthone compound (component B-3) as a polymerization initiator.

There are no particular restrictions on the thioxanthone compound, and although it is possible to use a commonly known compound, a compound represented by Formula (b-3) below is desirable.

[C 18]

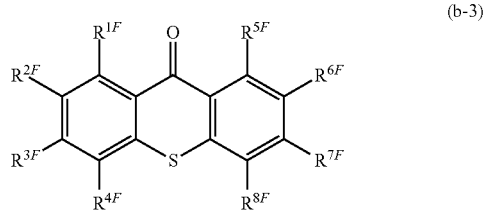

(b-3)

In Formula (b-3), $R^{1F}$, $R^{2F}$, $R^{3F}$, $R^{4F}$, $R^{5F}$, $R^{6F}$, $R^{7F}$ and $R^{8F}$ respectively and independently represent: a hydrogen atom, an alkyl group, a halogen atom, a hydroxyl group, a cyano group, a nitro group, an amino group, an alkyl thio group, an alkyl amino group (including a single or double substitution, the same applies below), an alkoxy group, an alkoxy carbonyl group, an acyloxy group, an acyl group, a carboxy group or a sulfo group. In the alkyl group, alkyl thio group, alkyl amino group, alkoxy group, alkoxy carbonyl group, acyloxy group, and acyl group, the number of carbon atoms in the alkyl portion is desirably 1 to 20, more desirably, 1 to 8, and even more desirably, 1 to 4.

$R^{1F}$, $R^{2F}$, $R^{3F}$, $R^{4F}$, $R^{5F}$, $R^{6F}$, $R^{7F}$ and $R^{8F}$ may respectively form a ring by two thereof linking with each other. The ring structure in a case where such a ring is formed may be a 5 or 6-part alicyclic ring, aromatic ring, or the like, and may also be a complex ring including an element other than a carbon atom, or a two-core ring, for example, a condensed ring, in which the formed rings are further combined with each other. These ring structures may also include a substitute group. Possible examples of a substitute group are: a halogen atom, a hydroxyl group, a cyano group, a nitro group, an amino group, an alkyl thio group, an alkyl amino group, an alkoxy group, an alkoxy carbonyl group, an acyloxy group, an acyl group, a carboxy group and a sulfo group. Examples of a hetero atom in which the formed ring structure is a complex ring may include N, O and S.

Examples of the thioxanthone compound are: thioxanthone, 2-isopropyl thioxanthone, 4-isopropyl thioxanthone, 2-chloro thioxanthone, 2-dodecyl thioxanthone, 2,4-dichloro thioxanthone, 2,3-diethyl thioxanthone, 1-chloro-4-propoxy thioxanthone, 2-cyclohexyl thioxanthone, 4-cyclohexyl thioxanthone, 2,4-diethyl thioxanthone, 2,4-dimethyl thioxanthone, 1-methoxy carbonyl thioxanthone, 2-ethoxy carbonyl thioxanthone, 3-(2-methoxy ethoxy carbonyl)thioxanthone, 4-butoxy carbonyl thioxanthone, 3-butoxy carbonyl-7-methyl thioxanthone, 1-cyano-3-chloro thioxanthone, 1-ethoxy carbonyl-3-chloro thioxanthone, 1-ethoxy carbonyl-3-ethoxy thioxanthone, 1-ethoxy carbonyl-3-amino thioxanthone, 1-ethoxy carbonyl-3-phenyl sulfuryl thioxanthone, 3,4-di[2-(2-methoxy ethoxy)ethoxy carbonyl]thioxanthone, 1-ethoxy carbonyl-3-(1-methyl-1-morpholino ethyl)thioxanthone, 2-methyl-6-dimethoxy methyl thioxanthone, 2-methyl-6-(1,1-dimethoxy benzyl)thioxanthone, 2-morpholino methyl thioxanthone, 2-methyl-6-morpholino methyl thioxanthone, n-allyl thioxanthone-3,4-dicarboximide, n-octyl thioxanthone-3,4-dicarboximide, N-(1,1, 3,3-tetramethyl butyl)thioxanthone-3,4-dicarboximide, 1-phenoxy thioxanthone, 6-ethoxy carbonyl-2-methoxy thioxanthone, 6-ethoxy carbonyl-2-methyl thioxanthone, thioxanthone-2-polyethylene glycol ester, 2-hydroxyl-3-(3, 4-dimethyl-9-oxo-9H-thioxanthone-2-yloxy)-N,N,N-trimethyl-1-propane aminium chloride, and the like. Of these, desirable examples from the viewpoint of ease of procurement and curability, are thioxanthone, 2,3-diethyl thioxanthone, 2,4-diethyl thioxanthone, 2,4-dichloro thioxanthone, 1-chloro-4-propoxy thioxanthone, 2-cyclohexyl thioxanthone, 4-cyclohexyl thioxanthone, 2-isopropyl thioxanthone, and 4-isopropyl thioxanthone, among which 2-isopropyl thioxanthone, and 4-isopropyl thioxanthone are more desirable.

The content of component B-3 is desirably 0.5 to 10 wt %, and more desirably, 1 to 5 wt % with respect to the whole of the ink composition.

(Component B-4) α-Amino Alkyl Ketone Compound

The ink composition used in the present invention desirably also includes an α-aminoalkyl phenone compound (component B-4) as the component B. By including the component B-4, an ink component having even better curing properties is obtained. Desirably, the component B-4 is a compound represented by Formula (b-4).

[C 19]

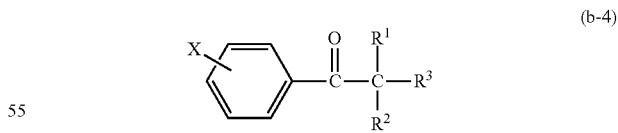

(b-4)

In Formula (b-4), $R^1$, $R^2$ and $R^3$ respectively and independently represent an hydroxyl group, an alkyl group which may have a substitute group, an alkoxy group which may have a substitute group, or an amino group which may have a substitute group, X represents a hydrogen atom or an amino group which may have a substitute group, an alkyl thio group which may have a substitute group, or an alkyl group which may have a substitute group. At least one of $R^1$, $R^2$ and $R^3$ represents an amino group, which may be substituted. The substitute groups when $R^1$, $R^2$ and $R^3$ and X are an amino group may be bonded together to form a complex ring group. The substitute group may be an alkyl group having 1 to 10 carbon atoms.

The component B-4 is desirably a compound represented by one of Formula (b-4-1) and Formula (b-4-2).

[C 20]

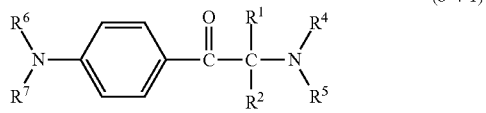

(b-4-1)

In Formula (b-4-1), $R^4$, $R^5$, $R^6$ and $R^7$ respectively represent an alkyl group which may have a substitute group, and at least one of $R^4$ and $R^5$, or $R^6$ and $R^7$, may be bonded together to form a complex ring group. $R^1$, $R^2$ and the substitute group respectively have the same definitions as $R^1$, $R^2$ and the substitute group in Formula (b-4).

[C 21]

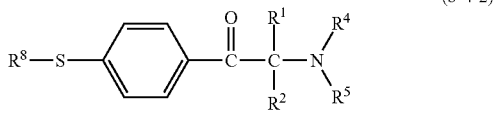

(b-4-2)

In Formula (b-4-2), $R^8$ represents an alkyl group which may have a substitute group.

$R^1$, $R^2$ and the substitute group have the same definitions as $R^1$, $R^2$ and the substitute group in Formula (b-4), and $R^4$ and $R^5$ have the same definitions as $R^4$ and $R^5$ in Formula (b-4-1).

There are no particular restrictions on the complex ring group, and it is possible to select a suitable group, although a morpholino group is desirable.

For the α-amino alkyl phenone compound, for example, it is possible to use a commercial product such as IRGACURE 369 (made by BASF Japan), or IRGACURE 907 (made by BASF Japan), etc.

The content of component B-4 is desirably 0.5 to 10 wt %, and more desirably, 1 to 5 wt % with respect to the whole of the ink composition.

A desirable embodiment of the component B in the present invention contains the component B-1 and/or B-2 and B-3, and more desirably, contains at least the component B-1, the content thereof being no greater than 3 wt % with respect to the total weight of the ink composition. More desirably, the component B also contains a combination of the components B-1, B-3 and B-4, and especially desirably, the component B contains a combination of the components B-1 to B-3.

The total content of the component B in the present invention is desirably 1 to 20 wt %, more desirably 5 to 15 wt %, and especially desirably, 8 to 10 wt %, with respect to the whole of the ink composition.

The ink composition used in the present invention may include a further polymerization initiator, apart from the polymerization initiator in components B-1 to B-4. Possible examples a further polymerization initiator include: a monoacyl phosphine compound, an α-hydroxyl ketone compound, an aromatic ketone, an aromatic onium chloride compound, an organic peroxide, a thio compound, a hexaaryl biimidazole compound, a ketoxime ester compound, a borate compound, an azinium compound, a metallocene compound, an active ester compound, and a compound having a carbon halogen bond.

The details of the polymerization initiator described above are commonly known to persons skilled in the art and are described, for example, in paragraphs 0090 to 0116 of Japanese Patent Application Publication No. 2009-185186.

(Component C) Colorant

The ink composition used in the present invention contains a colorant (component C).

The component C contributes to improving the visibility of the image portion that is formed. There are no particular restrictions on the component C, but a pigment or oil-soluble dye having excellent weathering resistance and rich color reproductivity is desirable, and any commonly known colorant, such as an oil-soluble dye, can be selected. From the viewpoint of reducing the sensitivity of the curing reaction by the active radiation beam, it is desirable to select for the component C a compound which does not function as a polymerization inhibitor.

The pigment and dye which is used as the component C are described below.

The pigment which can be used in the present invention is not subject to particular restrictions, but it is possible to use organic or inorganic pigments having the numbers indicated below, which are described in a color index, for example.

According to the objective, it is possible to use, as a red or magenta pigment, C.I. Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 202, 208, 216, 226, 257, C.I. Pigment Violet 3, 19, 23, 29, 30, 37, 50, 88, C.I. Pigment Orange 13, 16, 20, 36, as a blue or cyan pigment, C.I. Pigment Blue 1, 15, 15:1, 15:2, 15:3, 15:4, 15:6, 16, 17-1, 22, 27, 28, 29, 36, 60, as a green pigment, C.I. Pigment Green 7, 26, 36, 50, as a yellow pigment, C.I. Pigment Yellow 1, 3, 12, 13, 14, 17, 34, 35, 37, 55, 74, 81, 83, 93, 94, 95, 97, 108, 109, 110, 120, 137, 138, 139, 150, 153, 154, 155, 157, 166, 167, 168, 180, 185, 193, as a black pigment, C.I. Pigment Black 7, 28, 26, and as a white pigment, C.I. Pigment White 6, 18, 21, and so on.

In the present invention, it is possible to use a disperse dye, within a range that is soluble in an immiscible organic solvent. The disperse dye also includes a general water-soluble dye, but in the present invention, it is desirable to use a dye in a range that is soluble in an immiscible organic solvent.

Desirable examples of a disperse dye are: C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9, etc.

Desirably, the colorant is dispersed suitably in the ink composition after being added to the ink composition. It is possible to use various dispersion apparatuses for the dispersion of the colorant, such as a ball mill, sand mill, attritor, roll mill, agitator, Henschel mixer, colloid mill, ultrasonic homogenizer, pearl mill, wet jet mill, paint shaker, or the like.

The colorant may be added directly together with the respective components, when preparing the ink composition. Furthermore, in order to improve dispersion, it is possible to previously add a dispersion medium, such as a solvent or a polymerizable compound used in the present invention, and to uniformly disperse or dissolve this dispersion medium with the colorant, and then combine the colorant with the ink composition.

In the present invention, desirably, in order to avoid problems such as deterioration of the solvent resistance when solvent is left in the cured image, and versatile organic compounds (VOCs) in the remaining solvent, the colorant is previously added and combined with a dispersion medium, such as the polymerizable compound. In other words, desirably, the colorant does not include a solvent. Considering only the perspective of dispersability, it is desirable to select the monomer having the lowest viscosity as the polymerizable compound used in the addition of the colorant. One or two or more colorants should be selected suitably in accordance with the intended use of the ink composition.

If using a colorant, such as a pigment which is present in a solid form in the ink composition, it is preferable to select the colorant, the dispersant and the dispersion medium, and to set the dispersion conditions and the filtering conditions, in such a manner that the average particle size of the colorant particles is desirably 0.005 to 0.5 micrometers, more desirably, 0.01 to 0.45 micrometers, and even more desirably 0.015 to 0.4 micrometers. This management of the particle size is desirable since it makes it possible to suppress blockages of the head nozzles, and to maintain storage stability of the ink composition, as well as transparency and curing sensitivity.

The content of the component C in the ink composition is selected appropriately in accordance with the color and the intended use, but desirably the content of the component C is 0.1 to 20 wt %, more desirably, 0.5 to 10 wt % and even more desirably, 1 to 5 wt %, with respect to the total weight of the ink composition.

<Dispersant>

The ink composition used in the present invention desirably includes a dispersant. In particular, when using a pigment, it is desirable to include a dispersant in order that the pigment is dispersed stably in the ink composition. The dispersant is desirably a polymer dispersant. The "polymer dispersant" in the present invention means a dispersant having a weight-average molecular weight of no less than 1,000.

Possible examples of a polymer dispersant are: DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, DISPERBYK-182 (BYK Chemie Co., Ltd.); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580 (Efka Additives), Dispersaid 6, Dispersaid 8, Dispersaid 15, Dispersaid 9100 (Sannopco); Solsperse 3000, 5000, 9000, 12000, 13240, 13940, 17000, 22000, 24000, 26000, 28000, 32000, 36000, 39000, 41000, 71000, or other various Solsperse dispersants (Noveon); Adeka Pluronic L31, F38, L42, L44, L61, L64, F68, L72, P95, F77, P84, F87, P94, L101, P103, F108, L121, P-123 (Adeka); Ionate S-20 (Sanyo Chemical Industries), Disparlon KS-860, 873SN, 874 (polymer dispersant), #2150 (alicyclic multivalent carboxylic acid), #7004 (polyether ester) (Kusumoto Chemicals Ltd.), and so on.

The content of the dispersant in the ink composition can be selected appropriately depending on the intended use, but a content of 0.05 to 15 wt % with respect to the total weight of the ink composition is desirable.

<Surface Active Agent>

The ink composition used in the present invention desirably contains no silicone surface active agent or fluorine surface active agent, or has a total content of silicone surface active agent and fluorine surface active agent which is less than 0.01 wt % with respect to the total weight of the ink composition, and more desirably the ink composition contains no silicone surface active agent or fluorine surface active agent, or has a total content thereof which is not greater than 0.005 wt % with respect to the total weight of the ink composition, and especially desirably, the ink composition contains no silicone surface active agent or fluorine surface active agent.

Possible examples of a surface active agent other than a silicone surface active agent or a fluorine surface active agent are described in Japanese Patent Application Publication No. 62-173463 and Japanese Patent Application Publication No. 62-183457. For example, there are anionic surface active agents, such as a dialkyl sulfosuccinate, an alkyl naphthalene sulfonate, a fatty acid salt, or the like; nonionic surface active agents, such as a polyoxyethylene alkyl ether, a polyoxyethylene alkyl allyl ether, an acetylene glycol, a polyoxyethylene/polyoxypropylene block copolymer, or the like, a cationic surface active agent, such as an alkyl amine salt, a quaternary ammonium salt, and the like.

Furthermore, the ink composition used in the present invention desirably contains no surface active agent other than a silicone surface active agent and a fluorine surface active agent, or has a content thereof which is less than 0.01 wt % with respect to the total weight of the ink composition, and more desirably, has a content thereof which is no more than 0.005 wt %, and especially desirably, has no content thereof.

One example of a commercially available silicone surface active agent is BYK-307 (BYK Chemie).

<Oligomer>

The ink composition used in the present invention desirably includes an oligomer.

In general, an oligomer is a polymer in which a limited number of monomers (usually 5 to 100) are bonded, and it is possible to choose any commonly known compound which is called an oligomer, although in the present invention, it is desirable to select a polymer having a weight-average molecular weight of 400 to 10,000 (and more desirably, 500 to 5,000).

The oligomer may have a radically polymerizable group. The radically polymerizable group is desirably an ethylenically unsaturated group, and more desirably, a (meth)acryloxy group.

The oligomer used in the present invention may be any oligomer, and possible examples thereof are: an olefin oligomer (ethylene oligomer, propylene oligomer, butene oligomer, etc.), a vinyl oligomer (styrene oligomer, vinyl alcohol oligomer, vinyl pyrrolidone oligomer, acrylate oligomer, methacrylate oligomer, etc.), a diene oligomer (butadiene oligomer, chloroprene rubber, pentadiene oligomer, etc.), a ring-opening polymerization oligomer (di-, tri-tetra-ethylene glycol, polyethylene glycol, polyether imine, etc.) an addition polymerization oligomer (oligo ester acrylate, polyamide oligomer, polyisocyanate oligomer), an addition condensation oligomer (phenol resin, amino resin, xylene resin, ketone resin, etc.), or the like. Of these, an oligo ester(meth)acrylate is desirable, and of these, a urethane(meth)acrylate, a polyester(meth)acrylate, an epoxy(meth)acrylate are more desirable, and a urethane(meth)acrylate is most desirable.

Desirable examples of a urethane(meth)acrylate are: an aliphatic urethane (meth)acrylate and an aromatic urethane (meth)acrylate, but an aliphatic urethane (meth)acrylate is more desirable.

Furthermore, the urethane(meth)acrylate is desirably a quadrifunctional or lower-function urethane(meth)acrylate, and is more desirably a bifunctional or monofunctional urethane(meth)acrylate.

By including a urethane(meth)acrylate, it is possible to obtain an ink composition having excellent adhesion to the base material and excellent curing properties.

Information about oligomers can also be found in the Oligomer Handbook (J. Furukawa, ed., The Chemical Daily Co., Ltd.).

Furthermore, examples of commercially available oligomer products include those listed below.

For urethane(meth)acrylate, examples include: Dai'ichi Kogyo Seiyaku Co., Ltd. R1204, R1211, R1213, R1217, R1218, R1301, R1302, R1303, R1304, R1306, R1308, R1901, R1150, etc., Daicel Saitech Co., Ltd. EBECRYL series (for example EBECRYL230, 270, 4858, 8402, 8804, 8807, 8803, 9260, 1290, 1290K, 5129, 4842, 8210, 210, 4827, 6700, 4450, 220), Shin Nakamura Chemical Co., Ltd. NK Oligomer U-4HA, U-6HA, U-15HA, U-108A, U200AX, etc., Toa Gosei Co., Ltd. Aronix M-1100, M-1200, M-1210, M-1310, M-1600, M-1960, and Sartomer Co., Ltd. CN964A85, CN962, CN983, and the like.

For polyester (meth)acrylate, examples include Daicel Saitech Co., Ltd. EBECRYL series (for example, EBECRYL 770, IRR467, 81, 84, 83, 80, 675, 800, 810, 812, 1657, 1810, IRR302, 450, 670, 830, 870, 1830, 1870, 2870, IRR267, 813, 1RR483, 811, etc.), Toa Gosei Co., Ltd. Aronix M-6100, M-6200, M-6250, M-6500, M-7100, M-8030, M-8060, M-8100, M-8530, M-8560, M-9050, etc.

Furthermore, for epoxy (meth)acrylate, examples include: Daicel Saitech Co., Ltd. EBECRYL series (for example, EBECRYL600, 860, 2958, 3411, 3600, 3605, 3700, 3701, 3703, 3702, 3708, RDX63182, 6040, etc.), and the like.

It is possible to use either one type only, or a combination of two or more types, of oligomer.

The content of the oligomer in the ink composition used in the present invention is desirably 0.1 to 50 wt %, and more desirably, 0.5 to 20 wt %, and even more desirably, 1 to 10 wt %, with respect to the total weight of the ink composition.

<Other Components>

The ink composition used in the present invention may also include other components apart from those stated above, according to requirements, such as a sensitizing agent, an ultraviolet light absorber, an antioxidant, an anti-fading agent, a conductive salt, a solvent, a basic compound, and so on. Commonly known materials can be used for these other components, for instance, those described in Japanese Patent Application Publication No. 2009-221416.

The ink composition used in the present invention desirably contains a polymerization inhibitor from the viewpoint of improving storage properties.

If the ink composition is used as an ink composition for inkjet recording, then the ink composition is desirably ejected by being heated to reduce the viscosity in a range of 25 to 80° C., and desirably a polymerization inhibitor is added in order to prevent head blockages due to thermal polymerization.

The polymerization inhibitor may be a nitroso type polymerization inhibitor, hydroquinone, benzoquinone, p-methoxy phenol, TEMPO, TEMPOL, cupferron A1, a hindered amine, or the like, and of these, a nitroso type polymerization inhibitor and a hindered amine type polymerization inhibitor.

Concrete examples of a nitroso type polymerization inhibitor which is desirable for use in the present invention are given below, but are not limited to these.

[C 22]

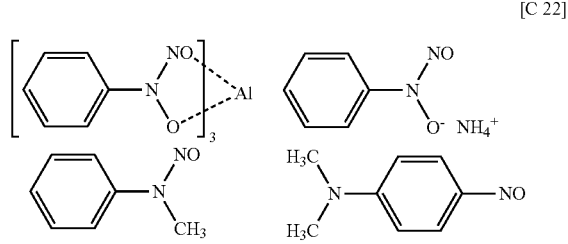

An example of a commercial nitroso type polymerization inhibitor is FIRSTCURE ST-1 (Chem First Co., Ltd.), or the like. Examples of commercial hindered amine type polymerization inhibitors are: TINUVIN 292, TINUVIN 770DF, TINUVIN 765, and TINUVIN 123.

The content of the polymerization inhibitor in the ink composition used in the present invention is desirably 0.01 to 2 wt %, more desirably 0.1 to 1.5 wt % and even more desirably, 0.2 to 1.2 wt %. If the content is set within the range stated above, it is possible to suppress the occurrence of polymerization during the manufacture and storage of the ink composition, and blockage of the inkjet nozzles can be prevented.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:
1. An inkjet recording apparatus, comprising:
a carriage which is equipped with:
an emission unit which emits an active light beam; and
an image forming unit which forms an image by inkjet ejection of color ink, clear ink, and white ink that are cured by the active light beam, wherein
the carriage has a scanning device which bi-directionally scans a recording medium in a main scanning direction perpendicular to a direction of conveyance of the recording medium, and
the emission unit includes provisional curing devices which are provided on both sides of the image forming unit in the scanning direction, and a main curing device which is provided on a downstream side of the conveyance direction of the recording medium,
the inkjet recording apparatus further comprising a control unit which implements, when the color ink is ejected, droplet ejection of the color ink while switching on the provisional curing device on a front side in the main scanning direction, and switching off, immediately after the droplet ejection, the provisional curing device on a rear side in the main scanning direction.

2. The inkjet recording apparatus as defined in claim 1, wherein emission by the provisional curing devices is carried out in a range of from 0.1 second to 3 seconds after the ejection of ink droplets.

3. The inkjet recording apparatus as defined in claim 1, wherein
the ink contains a radically polymerizable compound as a component A, a radical polymerization initiator as a component B, and a colorant as a component C;

the component A contains a monofunctional radically polymerizable compound as a component A-1, and a polyfunctional radically polymerizable compound as a component A-2;

the component A-1 contains an N-vinyl compound as a component A-1-1 and a compound represented by Formula (I) below as a component A-1-2;

the content of the component A-1 is not less than 50 weight percent and not more than 90 weight percent with respect to a total weight of the component A;

the content of the component A-1-1 is not less than 10 weight percent and not more than 40 weight percent with respect to a total weight of the component A-1;

the content of the component A-1-2 is not less than 5 weight percent and not more than 90 weight percent with respect to the total weight of the component A-1; and the component A-2 contains at least two types of compound represented by Formula (II) below, the content of the component A-2 being not less than 0.1 weight percent and not more than 25 weight percent with respect to the total weight of the component A;

[Formula (I)]

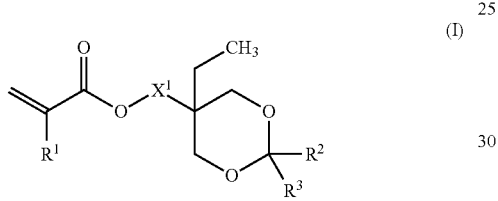

(where, $R^1$, $R^2$ and $R^3$ respectively and independently represent a hydrogen atom, a methyl group, or an ethyl group, and $X^1$ represents a single bond or a bivalent linking group);

[Formula (II)]

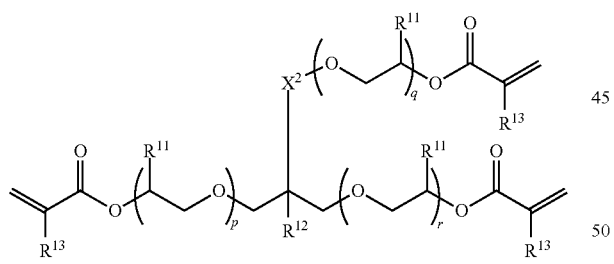

(where, $R^{11}$ respectively and independently represents a hydrogen atom or an alkyl group having 1 to 6 carbon atoms which may be substituted, $R^{12}$ represents a hydrogen atom or an alkyl group having 1 to 6 carbon atoms which may be substituted, $R^{13}$ respectively and independently represents a hydrogen atom or a methyl group, $X^2$ represents a single bond or a bivalent linking group, and p, q and r respectively and independently represent an integer from 0 to 5).

4. The inkjet recording apparatus as defined in claim 1, wherein a movement distance of the carriage in the scanning direction is equal to a width of the recording medium.

5. The inkjet recording apparatus as defined in claim 1, wherein a movement distance of the carriage in the scanning direction is an end to end possible movement distance for the scanning device.

6. The inkjet recording apparatus as defined in claim 1, wherein droplet ejection of the ink is carried out in both directions of movement of the carriage.

7. The inkjet recording apparatus as defined in claim 1, wherein droplet ejection of the ink is carried out only in one of both directions of movement of the carriage.

8. An inkjet recording method, comprising:
a recording medium conveyance step of conveying a recording medium;
a scanning step of scanning the recording medium, in a main scanning direction perpendicular to a conveyance direction of the recording medium, by a carriage equipped with an emission unit which emits an active light beam and an image forming unit which forms an image by inkjet ejection of color ink, clear ink, and white ink that are cured by the active light beam, the scanning step being able to perform bidirectional scanning;
an ink ejection step of ejecting the color ink, the clear ink, and the white ink by inkjet during the scanning step;
a provisional curing device changing step of controlling, when the color ink is ejected, provisional curing devices provided on both sides of the image forming unit in the main scanning direction, so as to switch on the provisional curing device on a front side in the main scanning direction and so as to switch off, immediately after droplet ejection of the color ink by the ejection, the provisional curing device on a rear side in the main scanning direction;
a provisional curing step of emitting the active light beam to an extent which incompletely cures the ink droplets which have become deposited to the recording medium, during scanning operation in an opposite direction to the main scanning direction in the ink ejection step; and
a main curing step of emitting an active light beam which fully cures the ink droplets by carrying out additional exposure on the ink droplets which have been exposed in the provisional curing step.

* * * * *